United States Patent
Huang et al.

(10) Patent No.: US 10,602,392 B2
(45) Date of Patent: Mar. 24, 2020

(54) WIRELESS COMMUNICATION METHOD AND WIRELESS COMMUNICATION APPARATUS

(71) Applicant: HUAWEI TECHNOLOGIES CO., LTD., Shenzhen, Guangdong (CN)

(72) Inventors: Yada Huang, Shanghai (CN); Jian Zhang, Shenzhen (CN); Qinghai Zeng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/916,624

(22) Filed: Mar. 9, 2018

(65) Prior Publication Data

US 2018/0199227 A1 Jul. 12, 2018

Related U.S. Application Data

(63) Continuation of application No. PCT/CN2016/098608, filed on Sep. 9, 2016.

(30) Foreign Application Priority Data

Sep. 11, 2015 (CN) .......................... 2015 1 0575758

(51) Int. Cl.
*H04W 28/02* (2009.01)
*H04W 88/06* (2009.01)
(Continued)

(52) U.S. Cl.
CPC ....... *H04W 28/0205* (2013.01); *H04W 28/18* (2013.01); *H04W 28/26* (2013.01);
(Continued)

(58) Field of Classification Search
CPC . H04W 28/0205; H04W 28/18; H04W 28/26; H04W 56/0005; H04W 72/0406;
(Continued)

(56) References Cited

U.S. PATENT DOCUMENTS 8,498,666 B2* 7/2013 Sebire ................. H04L 5/001
455/552.1
2015/0139097 A1 5/2015 Kronander et al.
(Continued)

FOREIGN PATENT DOCUMENTS

| CN | 102149152 | 8/2011 |
| CN | 102264111 | 11/2011 |

(Continued)

OTHER PUBLICATIONS

International Search Report, dated Nov. 28, 2016, in International Application No. PCT/CN2016/098608 (4 pp.).
(Continued)

*Primary Examiner* — Afshawn M Towfighi
(74) *Attorney, Agent, or Firm* — Maier & Maier, PLLC

(57) ABSTRACT

The present invention provides a wireless communication method, so as to reduce costs and meet a personalized requirement for an air interface in time. The method is performed in a communication system using at least two air interfaces, and configuration information of the at least two air interfaces is different. The at least two air interfaces include a common air interface and at least one dedicated air interface. Configuration information of the common air interface is preconfigured in a network device and a terminal device.

20 Claims, 9 Drawing Sheets

(51) Int. Cl.
*H04W 68/00* (2009.01)
*H04W 92/02* (2009.01)
*H04W 88/10* (2009.01)
*H04W 28/18* (2009.01)
*H04W 28/26* (2009.01)
*H04W 56/00* (2009.01)
*H04W 72/04* (2009.01)

(52) U.S. Cl.
CPC ....... *H04W 56/0005* (2013.01); *H04W 68/00* (2013.01); *H04W 72/0406* (2013.01); *H04W 88/06* (2013.01); *H04W 88/10* (2013.01); *H04W 92/02* (2013.01)

(58) Field of Classification Search
CPC ..... H04W 88/06; H04W 92/02; H04W 88/10; H04W 68/00
See application file for complete search history.

(56) References Cited

U.S. PATENT DOCUMENTS

| 2015/0215915 A1* | 7/2015 | Boudreau | H04W 72/042 370/329 |
| 2015/0365861 A1 | 12/2015 | Sharony et al. | |
| 2016/0278149 A1 | 9/2016 | Uchino et al. | |

FOREIGN PATENT DOCUMENTS

| CN | 104170465 | 11/2014 |
| EP | 1432263 A1 | 6/2004 |
| JP | 2015-89040 A | 5/2015 |
| WO | 9857482 A1 | 12/1998 |
| WO | WO2004012467 | 2/2004 |

OTHER PUBLICATIONS

Written Opinion of the International Searching Authority, dated Nov. 28, 2016, in International Application No. PCT/CN2016/098608 (7 pp.).

Salient et al., "Decentralized spectrum and radio resource management enabled by an on-demand Cognitive Pilot Channel", Annales Des Telecommunications—Annals of Telecommunication, Get Lavoisier, Paris, FR, vol. 63, No. 5/6, May 1, 2008, XP001512307, pp. 281-294.

Salient et al., "Cognitive Pilot Channel Enabling Spectrum Awareness", Communications Workshops, 2009. ICC Workshops 2009, IEEE International Conference on, IEEE, Piscataway, NJ, USA, Jun. 14, 2009, XP031515500, pp. 6.

Extended European Search Report dated Jun. 26, 2018 in corresponding European Patent Application No. 16843686.3, pp. 9.

International Search Reported dated Nov. 28, 2016 in corresponding International Patent Application No. PCT/CN2016/098608.

European Office Action dated Apr. 29, 2019 in corresponding European Patent Application No. 16843686.3 (4 pages).

Lorenza Giupponi et al., "A Novel Approach for Joint Radio Resource Management Based on Fuzzy Neural Methodology", IEEE Transactions on Vehicular Technology, IEEE Service Center, vol. 57, No. 3, May 1, 2008, pp. 1789-1805, XP011201947, Piscataway, NJ, US.

* cited by examiner

200

| A terminal device receives configuration information of a target dedicated air interface and indication information of a target transmission resource from a network device through a common air interface, where the target transmission resource is a transmission resource used by the target dedicated air interface | ⟵ S210 |

| The terminal device performs wireless communication with the network device by using the target dedicated air interface and the target transmission resource | ⟵ S220 |

FIG. 3

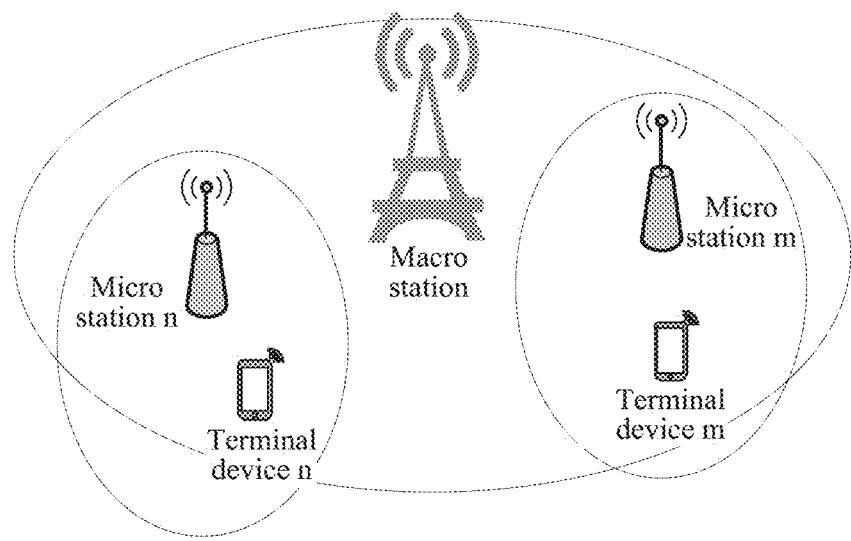

FIG. 4

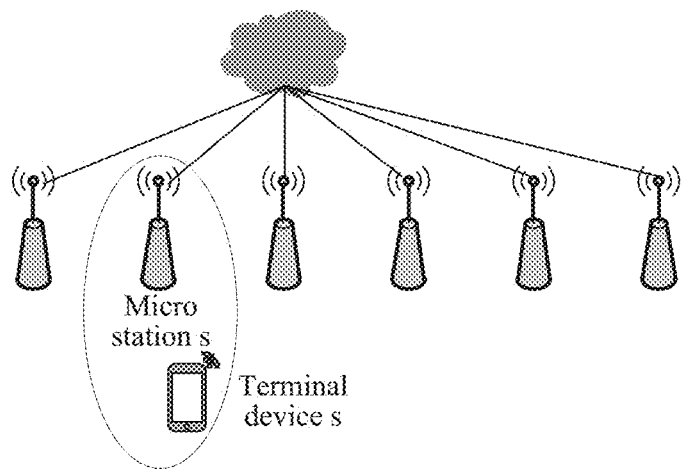

A network device sends configuration information of a target dedicated air interface and indication information of a target transmission resource to a terminal device through a common air interface, where the target transmission resource is a transmission resource used by the target dedicated air interface — S310

The network device performs wireless communication with the terminal device by using the target dedicated air interface and the target transmission resource — S320

FIG. 14

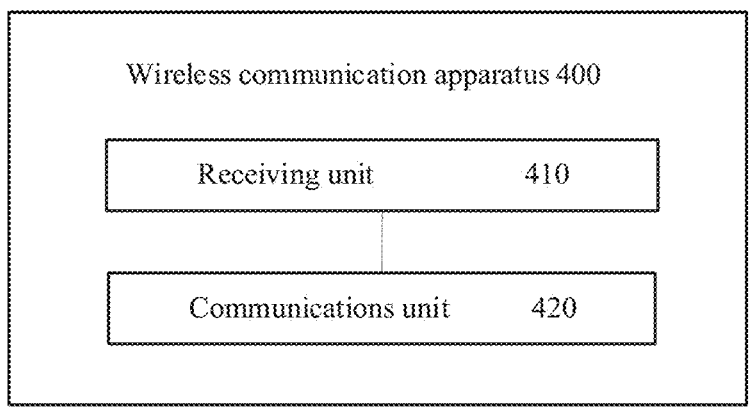

FIG. 15

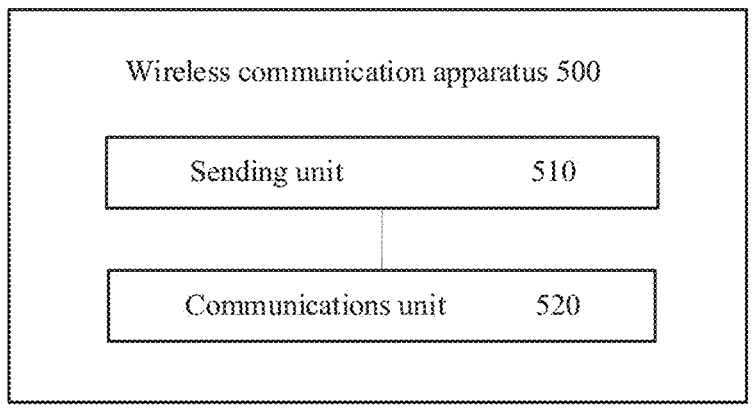

FIG. 16

WIRELESS COMMUNICATION METHOD AND WIRELESS COMMUNICATION APPARATUS

CROSS-REFERENCE TO RELATED APPLICATIONS

This application is a continuation of International Application No. PCT/CN2016/098608, filed on Sep. 9, 2016, which claims priority to Chinese Patent Application No. 201510575758.2, filed on Sep. 11, 2015, The disclosures of the aforementioned applications are hereby incorporated by reference in their entireties.

TECHNICAL FIELD

The present invention relates to the communication field, and more specifically, to a wireless communication method and a wireless communication apparatus.

BACKGROUND

In mobile communication, a terminal device communicates with a network device through an air interface. An "air interface" is a wireless transmission specification or an access mode (Access Modes) between a terminal device and a network device. Different air interfaces determine features of wireless communication, for example, a delay, a transmission rate, and coverage.

Different services have different requirements for wireless communication. For example, for a remote mechanical control service, an optimal connection service requires a low delay, a high bandwidth, and coverage of a particular geographic area in wireless communication. For another example, for a media transmission service, an optimal connection service requires a relatively high transmission rate, but has a low requirement for a delay in wireless communication.

For example, FIG. 1 is a comparison diagram of an example of a configuration of an air interface in a broadband service (for example, a media transmission service) and an example of a configuration of an air interface in an ultra short delay service (for example, an online game or a video conference). As shown in FIG. 1, the broadband service has a relatively low requirement for a delay, a length of a subframe is relatively large, and a control channel appears on first few symbols of each subframe. Therefore, an appearance period of a control channel is relatively long, and a frequency of control signaling is relatively low, resulting in a high RTT delay in signaling transmission. However, because a resource block on a data channel is relatively large, a granularity of a resource allocated each time by a control channel is also relatively large, and it is relatively suitable for a non-short delay broadband large datagram service. In addition, because appearance frequency of a control channel is relatively low, frequency of listening to a control channel by a terminal is also reduced, so that it is more energy-saving. By comparison, the ultra short delay service has a relatively high requirement for a delay. Therefore, a subframe is shortened, and frequency of a control channel becomes higher. Compared with the broadband service, within a same time period, the short delay service may have more chances to deliver control signaling, so that the service is scheduled in a more timely manner. Short delay scheduling may also require simpler encoding and decoding on a control channel and a data channel, so as to lower a processing delay.

As can be learned, it is very difficult to implement compatibility between the foregoing two services in a same system without mutual impact. Therefore, for the ultra short delay service, the air interface needs to be redesigned, and the configuration of the air interface in the broadband service cannot be used.

In addition, due to a standardization attribute of an air interface, if a network device or a terminal device is changed unilaterally, the two parties cannot complete wireless communication. Therefore, to meet requirements of different services for wireless communication, different communication systems or networks need to be configured for different services, to provide different air interfaces.

As mobile communication technologies are upgraded, requirements for new services are growing. To meet the requirements, based on the prior art, communication systems need to be separately established for different services, resulting in a significant increase in operational costs, and making it difficult to respond to a personalized requirement for an air interface in time.

SUMMARY

Embodiments of the present invention provide a wireless communication method and a wireless communication apparatus, so as to reduce costs and meet a personalized requirement for an air interface in time.

According to a first aspect, a wireless communication method is provided, performed in a communication system using at least two air interfaces, where configuration information of the at least two air interfaces is different, the at least two air interfaces include a common air interface and at least one dedicated air interface, configuration information of the common air interface is preconfigured in a network device and a terminal device, and the method includes: receiving, by the terminal device, configuration information of a target dedicated air interface and indication information of a target transmission resource from the network device through the common air interface, where the target transmission resource is a transmission resource used by the target dedicated air interface; and performing, by the terminal device, wireless communication with the network device by using the target dedicated air interface and the target transmission resource.

Optionally, for the present patent application, a "common air interface" and a "dedicated air interface" that are described may be considered as a manner of describing different air interfaces. A "common air interface" and a "dedicated air interface" may be understood as two different air interfaces, for example, understood as that: a "common air interface" is a first type of air interface, and a "dedicated air interface" is a second type of air interface. Different air interfaces may be applied to different numerology. The numerology generally refers to numerology of a communication technology, and specifically refers to a parameter configuration related to the communication technology, for example, including but not limited to: a subcarrier spacing or a cyclic prefix format.

For different air interfaces, a terminal-side device and a network-side device may use different wireless transmission specifications or access modes. If both the network-side device and the terminal-side device can support multiple pieces of numerology at the same time, a synchronization channel may be located in a subband corresponding to a baseline subcarrier spacing of 15 KHz, or may be located in another subband.

Similarly, if subsequently involved in this application, the definitions of an air interface discussed above are not described in detail again.

The terminal-side device may alternatively receive configuration information through any air interface supported by the terminal-side device. For example, the terminal-side device supports a first air interface and a second air interface. In this case, the terminal-side device may receive configuration information of the second air interface and indication information of a target transmission resource from the network device through the first air interface supported by the terminal-side device, where the target transmission resource is a transmission resource used by the target second air interface; and the terminal device performs wireless communication with the network device by using the target second air interface and the target transmission resource. Alternatively, the terminal-side device may receive configuration information of the first air interface and indication information of a target transmission resource from the network device through the second air interface, where the target transmission resource is a transmission resource used by the target first air interface; and the terminal device performs wireless communication with the network device by using the target first air interface and the target transmission resource.

Alternatively, the terminal-side device may receive configuration information of an air interface through the air interface.

Similarly, in a process in which the terminal-side device receives configuration information of an air interface and that is involved in this application, a part that may be applied to the content that is discussed above is not described in detail again. With reference to the first aspect, in a first implementation of the first aspect, the configuration information includes at least one of a waveform parameter, a modulation scheme, a multiple access method, a bandwidth configuration, a radio frame configuration method, a resource multiplexing mode, a user scheduling mode, a channel configuration method, a coding scheme, or a protocol stack configuration method.

With reference to the first aspect or the foregoing implementation of the first aspect, in a second implementation of the first aspect, the target dedicated air interface is determined by the network device in the at least one dedicated air interface according to related information of the terminal device, and the related information of the terminal device includes at least one of a service type of a service accessed by the terminal device, mobility of the terminal device, or a transmission rate requirement of the terminal device.

With reference to the first aspect or the foregoing implementation of the first aspect, in a third implementation of the first aspect, the receiving, by the terminal device according to the common air interface, configuration information of a target dedicated air interface and indication information of a target transmission resource that are sent by the network device includes: receiving, by the terminal device according to the common air interface, configuration information of the at least one dedicated air interface that is sent by the network device; and the method further includes: determining, by the terminal device, the target dedicated air interface in the at least one dedicated air interface according to related information of the terminal device, where the related information of the terminal device includes at least one of a service type of a service accessed by the terminal device, mobility of the terminal device, or a transmission rate requirement of the terminal device.

With reference to the first aspect or the foregoing implementations of the first aspect, in a fourth implementation of the first aspect, the method further includes: receiving, by the terminal device through the common air interface, broadcast information corresponding to the target dedicated air interface and sent by the network device; or receiving, by the terminal device through the target dedicated air interface, broadcast information corresponding to the target dedicated air interface and sent by the network device; or receiving, by the terminal device through the common air interface, public broadcast information sent by the network device, where the public broadcast information is same information in broadcast information corresponding to each dedicated air interface, and receiving, through the target dedicated air interface, information other than the public broadcast information in broadcast information corresponding to the target dedicated air interface and sent by the network device.

With reference to the first aspect or the foregoing implementations of the first aspect, in a fifth implementation of the first aspect, the method further includes: receiving, by the terminal device through the common air interface, a synchronization signal corresponding to the target dedicated air interface and sent by the network device, where the synchronization signal corresponding to the target dedicated air interface and a synchronization signal corresponding to the common air interface are a same signal; optionally, for this application, the same signal may use different transmission formats, for example, use transmission control parameters corresponding to different numerology; and similarly, a "same signal" involved in other related places in this application is not described in detail below again; or receiving, by the terminal device through the common air interface, a measurement signal corresponding to the target dedicated air interface and sent by the network device, where the measurement signal corresponding to the target dedicated air interface and a measurement signal corresponding to the common air interface are a same signal; or receiving, by the terminal device through the common air interface, a paging signal corresponding to the target dedicated air interface and sent by the network device, where the paging signal corresponding to the target dedicated air interface and a paging signal corresponding to the common air interface are carried on a same channel.

With reference to the first aspect or the foregoing implementations of the first aspect, in a sixth implementation of the first aspect, the method further includes: receiving, by the terminal device according to the target dedicated air interface, a synchronization signal corresponding to the target dedicated air interface and sent by the network device; or receiving, by the terminal device according to the target dedicated air interface, a measurement signal corresponding to the target dedicated air interface and sent by the network device; or receiving, by the terminal device according to the target dedicated air interface, a paging signal corresponding to the target dedicated air interface and sent by the network device.

With reference to the first aspect or the foregoing implementations of the first aspect, in a seventh implementation of the first aspect, the method further includes: performing, by the terminal device by using a same channel, access processing corresponding to the target dedicated air interface and access processing corresponding to the common air interface; or performing, by the terminal device by using different channels, access processing corresponding to the target dedicated air interface and access processing corresponding to the common air interface.

With reference to the first aspect or the foregoing implementations of the first aspect, in an eighth implementation of the first aspect, the network device includes a macro station and a micro station, the macro station performs wireless communication by using the common air interface, and the micro station performs wireless communication by using the dedicated air interface.

With reference to the first aspect or the foregoing implementations of the first aspect, in a ninth implementation of the first aspect, the communication system includes multiple micro stations, each micro station performs wireless communication by using the common air interface, and the network device is a micro station whose coverage covers a location of the terminal device.

According to a second aspect, a wireless communication method is provided, performed in a communication system using at least two air interfaces, where configuration information of the at least two air interfaces is different, the at least two air interfaces include a common air interface and at least one dedicated air interface, configuration information of the common air interface is preconfigured in a network device and a terminal device, and the method includes: sending, by the network device, configuration information of a target dedicated air interface and indication information of a target transmission resource to the terminal device through the common air interface, where the target transmission resource is a transmission resource used by the target dedicated air interface; and performing, by the network device, wireless communication with the terminal device by using the target dedicated air interface and the target transmission resource.

With reference to the second aspect, in a first implementation of the second aspect, the configuration information includes at least one of a waveform parameter, a modulation scheme, a multiple access method, a bandwidth configuration, a radio frame configuration method, a resource multiplexing mode, a user scheduling mode, a channel configuration method, a coding scheme, or a protocol stack configuration method.

With reference to the second aspect or the foregoing implementation of the second aspect, in a second implementation of the second aspect, the method further includes: obtaining, by the network device, related information of the terminal device, where the related information of the terminal device includes at least one of a service type of a service accessed by the terminal device, mobility of the terminal device, or a transmission rate requirement of the terminal device; and determining, by the network device, the target dedicated air interface in the at least one dedicated air interface according to the related information of the terminal device.

With reference to the second aspect or the foregoing implementation of the second aspect, in a third implementation of the second aspect, the sending, by the network device, configuration information of a target dedicated air interface and indication information of a target transmission resource to the terminal device through the common air interface includes: sending, by the network device, configuration information of the at least one dedicated air interface to the terminal device through the common air interface, so that the terminal device determines the target dedicated air interface in the at least one dedicated air interface according to related information of the terminal device, where the related information of the terminal device includes at least one of a service type of a service accessed by the terminal device, mobility of the terminal device, or a transmission rate requirement of the terminal device.

With reference to the second aspect or the foregoing implementations of the second aspect, in a fourth implementation of the second aspect, the method further includes: sending, by the network device, broadcast information corresponding to the target dedicated air interface to the network device through the common air interface; or sending, by the network device, broadcast information corresponding to the target dedicated air interface to the network device through the target dedicated air interface; or sending, by the network device, public broadcast information to the terminal device through the common air interface, where the public broadcast information is same information in broadcast information corresponding to each dedicated air interface, and sending information other than the public broadcast information in broadcast information corresponding to the target dedicated air interface to the terminal device through the target dedicated air interface.

With reference to the second aspect or the foregoing implementations of the second aspect, in a fifth implementation of the second aspect, the method further includes: sending, by the network device, a synchronization signal corresponding to the target dedicated air interface to the terminal device through the common air interface, where the synchronization signal corresponding to the target dedicated air interface and a synchronization signal corresponding to the common air interface are a same signal; or sending, by the network device, a measurement signal corresponding to the target dedicated air interface to the terminal device through the common air interface, where the measurement signal corresponding to the target dedicated air interface and a measurement signal corresponding to the common air interface are a same signal; or sending, by the network device, a paging signal corresponding to the target dedicated air interface to the terminal device through the common air interface, where the paging signal corresponding to the target dedicated air interface and a paging signal corresponding to the common air interface are carried on a same channel.

With reference to the second aspect or the foregoing implementations of the second aspect, in a sixth implementation of the second aspect, the method further includes: sending, by the network device, a synchronization signal corresponding to the target dedicated air interface to the terminal device through the target dedicated air interface; or sending, by the network device, a measurement signal corresponding to the target dedicated air interface to the terminal device through the target dedicated air interface; or sending, by the network device, a paging signal corresponding to the target dedicated air interface to the terminal device through the target dedicated air interface.

With reference to the second aspect or the foregoing implementations of the second aspect, in a seventh implementation of the second aspect, the method further includes: performing, by the network device by using a same channel, access processing corresponding to the target dedicated air interface and access processing corresponding to the common air interface; or performing, by the network device by using different channels, access processing corresponding to the target dedicated air interface and access processing corresponding to the common air interface.

With reference to the second aspect or the foregoing implementations of the second aspect, in an eighth implementation of the second aspect, the network device includes a macro station and a micro station, the macro station performs wireless communication by using the common air interface, and the micro station performs wireless communication by using the dedicated air interface.

With reference to the second aspect or the foregoing implementations of the second aspect, in a ninth implementation of the second aspect, the communication system includes multiple micro stations, each micro station performs wireless communication by using the common air interface, and the network device is a micro station whose coverage covers a location of the terminal device.

According to a third aspect, a wireless communication apparatus is provided, configured in a communication system using at least two air interfaces, where configuration information of the at least two air interfaces is different, the at least two air interfaces include a common air interface and at least one dedicated air interface, configuration information of the common air interface is preconfigured in a network device and the apparatus, and the apparatus includes: a receiving unit, configured to receive configuration information of a target dedicated air interface and indication information of a target transmission resource from the network device through the common air interface, where the target transmission resource is a transmission resource used by the target dedicated air interface; and a communication unit, configured to perform wireless communication with the network device by using the target dedicated air interface and the target transmission resource.

With reference to the third aspect, in a first implementation of the third aspect, the configuration information includes at least one of a waveform parameter, a modulation scheme, a multiple access method, a bandwidth configuration, a radio frame configuration method, a resource multiplexing mode, a user scheduling mode, a channel configuration method, a coding scheme, or a protocol stack configuration method.

With reference to the third aspect or the foregoing implementation of the third aspect, in a second implementation of the third aspect, the target dedicated air interface is determined by the network device in the at least one dedicated air interface according to related information of the apparatus, and the related information of the apparatus includes at least one of a service type of a service accessed by the apparatus, mobility of the apparatus, or a transmission rate requirement of the apparatus.

With reference to the third aspect or the foregoing implementation of the third aspect, in a third implementation of the third aspect, the receiving unit is specifically configured to receive, according to the common air interface, configuration information of the at least one dedicated air interface that is sent by the network device; and the apparatus further includes: a determining unit, configured to determine the target dedicated air interface in the at least one dedicated air interface according to related information of the apparatus, where the related information of the apparatus includes at least one of a service type of a service accessed by the apparatus, mobility of the apparatus, or a transmission rate requirement of the apparatus.

With reference to the third aspect or the foregoing implementations of the third aspect, in a fourth implementation of the third aspect, the receiving unit is further configured to receive, through the common air interface, broadcast information corresponding to the target dedicated air interface and sent by the network device; or the receiving unit is further configured to receive, through the target dedicated air interface, broadcast information corresponding to the target dedicated air interface and sent by the network device; or the receiving unit is further configured to receive, through the common air interface, public broadcast information sent by the network device, where the public broadcast information is same information in broadcast information corresponding to each dedicated air interface, and receive, through the target dedicated air interface, information other than the public broadcast information in broadcast information corresponding to the target dedicated air interface and sent by the network device.

With reference to the third aspect or the foregoing implementations of the third aspect, in a fifth implementation of the third aspect, the receiving unit is further configured to receive, by the apparatus through the common air interface, a synchronization signal corresponding to the target dedicated air interface and sent by the network device, where the synchronization signal corresponding to the target dedicated air interface and a synchronization signal corresponding to the common air interface are a same signal; or the receiving unit is further configured to receive, through the common air interface, a measurement signal corresponding to the target dedicated air interface and sent by the network device, where the measurement signal corresponding to the target dedicated air interface and a measurement signal corresponding to the common air interface are a same signal; or the receiving unit is further configured to receive, through the common air interface, a paging signal corresponding to the target dedicated air interface and sent by the network device, where the paging signal corresponding to the target dedicated air interface and a paging signal corresponding to the common air interface are carried on a same channel.

With reference to the third aspect or the foregoing implementations of the third aspect, in a sixth implementation of the third aspect, the receiving unit is further configured to receive, according to the target dedicated air interface, a synchronization signal corresponding to the target dedicated air interface and sent by the network device; or the receiving unit is further configured to receive, according to the target dedicated air interface, a measurement signal corresponding to the target dedicated air interface and sent by the network device; or the receiving unit is further configured to receive, according to the target dedicated air interface, a paging signal corresponding to the target dedicated air interface and sent by the network device.

With reference to the third aspect or the foregoing implementations of the third aspect, in a seventh implementation of the third aspect, the communication unit is further configured to perform, by the apparatus by using a same channel, access processing corresponding to the target dedicated air interface and access processing corresponding to the common air interface; or the communication unit is further configured to perform, by using different channels, access processing corresponding to the target dedicated air interface and access processing corresponding to the common air interface.

With reference to the third aspect or the foregoing implementations of the third aspect, in an eighth implementation of the third aspect, the network device includes a macro station and a micro station, the macro station performs wireless communication by using the common air interface, and the micro station performs wireless communication by using the dedicated air interface.

With reference to the third aspect or the foregoing implementations of the third aspect, in a ninth implementation of the third aspect, the communication system includes multiple micro stations, each micro station performs wireless communication by using the common air interface, and the network device is a micro station whose coverage covers a location of the apparatus.

According to a fourth aspect, a wireless communication apparatus is provided, configured in a communication system using at least two air interfaces, where configuration information of the at least two air interfaces is different, the at least two air interfaces include a common air interface and at least one dedicated air interface, configuration information of the common air interface is preconfigured in the apparatus and a terminal device, and the apparatus includes: a sending unit, configured to send configuration information of a target dedicated air interface and indication information of a target transmission resource to the terminal device through the common air interface, where the target transmission resource is a transmission resource used by the target dedicated air interface; and a communication unit, configured to perform wireless communication with the terminal device by using the target dedicated air interface and the target transmission resource.

With reference to the fourth aspect, in a first implementation of the fourth aspect, the configuration information includes at least one of a waveform parameter, a modulation scheme, a multiple access method, a bandwidth configuration, a radio frame configuration method, a resource multiplexing mode, a user scheduling mode, a channel configuration method, a coding scheme, or a protocol stack configuration method.

With reference to the fourth aspect or the foregoing implementation of the fourth aspect, in a second implementation of the fourth aspect, the apparatus further includes: an obtaining unit, configured to obtain related information of the terminal device, where the related information of the terminal device includes at least one of a service type of a service accessed by the terminal device, mobility of the terminal device, or a transmission rate requirement of the terminal device; and a determining unit, configured to determine the target dedicated air interface in the at least one dedicated air interface according to the related information of the terminal device.

With reference to the fourth aspect or the foregoing implementation of the fourth aspect, in a third implementation of the fourth aspect, the sending unit is specifically configured to send configuration information of the at least one dedicated air interface to the terminal device through the common air interface, so that the terminal device determines the target dedicated air interface in the at least one dedicated air interface according to related information of the terminal device, where the related information of the terminal device includes at least one of a service type of a service accessed by the terminal device, mobility of the terminal device, or a transmission rate requirement of the terminal device.

With reference to the fourth aspect or the foregoing implementations of the fourth aspect, in a fourth implementation of the fourth aspect, the sending unit is further configured to send broadcast information corresponding to the target dedicated air interface to the apparatus through the common air interface; or the sending unit is further configured to send broadcast information corresponding to the target dedicated air interface to the apparatus through the target dedicated air interface; or the sending unit is further configured to: send public broadcast information to the terminal device through the common air interface, where the public broadcast information is same information in broadcast information corresponding to each dedicated air interface, and send information other than the public broadcast information in broadcast information corresponding to the target dedicated air interface to the terminal device through the target dedicated air interface.

With reference to the fourth aspect or the foregoing implementations of the fourth aspect, in a fifth implementation of the fourth aspect, the sending unit is further configured to send a synchronization signal corresponding to the target dedicated air interface to the terminal device through the common air interface, where the synchronization signal corresponding to the target dedicated air interface and a synchronization signal corresponding to the common air interface are a same signal; or the sending unit is further configured to send a measurement signal corresponding to the target dedicated air interface to the terminal device through the common air interface, where the measurement signal corresponding to the target dedicated air interface and a measurement signal corresponding to the common air interface are a same signal; or the sending unit is further configured to send a paging signal corresponding to the target dedicated air interface to the terminal device through the common air interface, where the paging signal corresponding to the target dedicated air interface and a paging signal corresponding to the common air interface are carried on a same channel.

With reference to the fourth aspect or the foregoing implementations of the fourth aspect, in a sixth implementation of the fourth aspect, the sending unit is further configured to send a synchronization signal corresponding to the target dedicated air interface to the terminal device through the target dedicated air interface; or the sending unit is further configured to send a measurement signal corresponding to the target dedicated air interface to the terminal device through the target dedicated air interface; or the sending unit is further configured to send a paging signal corresponding to the target dedicated air interface to the terminal device through the target dedicated air interface.

With reference to the fourth aspect or the foregoing implementations of the fourth aspect, in a seventh implementation of the fourth aspect, the communication unit is further configured to perform, by using a same channel, access processing corresponding to the target dedicated air interface and access processing corresponding to the common air interface; or the communication unit is further configured to perform, by using different channels, access processing corresponding to the target dedicated air interface and access processing corresponding to the common air interface.

With reference to the fourth aspect or the foregoing implementations of the fourth aspect, in an eighth implementation of the fourth aspect, the apparatus includes a macro station and a micro station, the macro station performs wireless communication by using the common air interface, and the micro station performs wireless communication by using the dedicated air interface.

With reference to the fourth aspect or the foregoing implementations of the fourth aspect, in a ninth implementation of the fourth aspect, the communication system includes multiple micro stations, each micro station performs wireless communication by using the common air interface, and the apparatus is a micro station whose coverage covers a location of the terminal device.

According to the wireless communication method and the wireless communication apparatus in the embodiments of the present invention, the terminal device and the network device determine through negotiation, through a specified common air interface, in at least one dedicated air interface, a target dedicated air interface and a transmission resource used by the target dedicated air interface, and perform wireless communication by using the target dedicated air interface, so that multiple air interfaces can share one communication system, and a communication system does not need to be separately configured for a dedicated air interface, thereby reducing costs and meeting a personalized requirement for an air interface in time.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 3 is a schematic flowchart of a wireless communication method according to an embodiment of the present invention;

FIG. 4 is a schematic composition diagram of a network device according to an embodiment of the present invention;

FIG. 5 is a schematic composition diagram of a network device according to another embodiment of the present invention;

FIG. 14 is a schematic flowchart of a wireless communication method according to another embodiment of the present invention;

FIG. 15 is a schematic block diagram of a wireless communication apparatus according to an embodiment of the present invention;

FIG. 16 is a schematic block diagram of a wireless communication apparatus according to another embodiment of the present invention;

DESCRIPTION OF EMBODIMENTS

Figure 1:
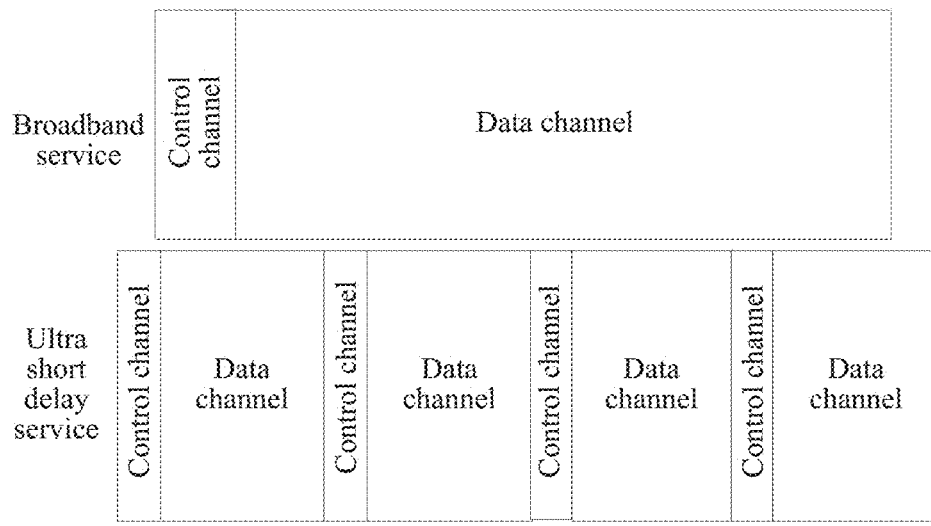
FIG. 1 is a comparison diagram of an example of a configuration of an air interface in a broadband service and an example of a configuration of an air interface in an ultra short delay service.

Terms such as "unit" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from component interacting with another component in a local system, a distributed system, and/or across a network such as the Internet interacting with other systems by using the signal).

The solutions in the embodiments of the present invention may be applied to existing cellular communication systems, for example, a Global System for Mobile communication (the English acronym may be: GSM), Wideband Code Division Multiple Access (the English acronym may be: WCDMA) system, and a Long Term Evolution (the English acronym may be: LTE) system. The existing cellular communication systems mainly support voice and data communication. Generally, connections supported by a conventional base station are limited in quantity, and therefore are easily implemented.

Optionally, the network device is a base station, and the terminal device is user equipment.

The embodiments are described with reference to a terminal device in the present invention. The terminal device may also be referred to as user equipment (UE), an access terminal, a subscriber unit, a subscriber station, a mobile station, a mobile, a remote station, a remote terminal, a mobile device, a user terminal, a terminal, a wireless communication device, a user agent, or a user apparatus. The terminal device may be a STA (STATION, station) in a WLAN (Wireless Local Area Networks, wireless local area network), or may be a cellular phone, a cordless phone, a SIP (Session Initiation Protocol, Session Initiation Protocol) phone, a WLL (Wireless Local Loop, wireless local loop)

station, a PDA (Personal Digital Assistant, personal digital assistant), a handheld device having a wireless communication function, a computing device, another processing device connected to a wireless modem, an in-vehicle device, a wearable device, a terminal device in a future 5G network, a terminal device in a future evolved public land mobile network (PLMN, Public Land Mobile Network), or the like.

In addition, the present invention describes the embodiments with reference to a network device. The network device may be a device used to communicate with a mobile device. The network device may be an AP (access point) in a WLAN (wireless local area network) or a BTS (base transceiver station) in GSM or CDMA (Code Division Multiple Access), may be an NB (NodeB) in WCDMA, or may be an eNB or eNodeB (evolved NodeB) in LTE (Long Term Evolution), a relay station, an access point, an in-vehicle device, a wearable device, a terminal device in a future 5G network, a network device in a future evolved PLMN network, or the like.

In addition, aspects or features of the present invention may be implemented as a method, an apparatus or a product that uses standard programming and/or engineering technologies. The term "product" used in this application covers a computer program that can be accessed from any computer readable component, carrier or medium. For example, the computer-readable medium may include but is not limited to: a magnetic storage component (for example, a hard disk, a floppy disk, or a magnetic tape), an optical disc (for example, a CD (Compact Disk, compact disk), a DVD (Digital Versatile Disk, digital versatile disk), a smart card and a flash memory component (for example, EPROM (Erasable Programmable Read-Only Memory, erasable programmable read-only memory), a card, a stick, or a key drive). In addition, various storage media described in this specification may indicate one or more devices and/or other machine-readable media that is used to store information. The term "machine readable media" may include but is not limited to a radio channel, and various other media that can store, contain and/or carry an instruction and/or data.

Figure 2:
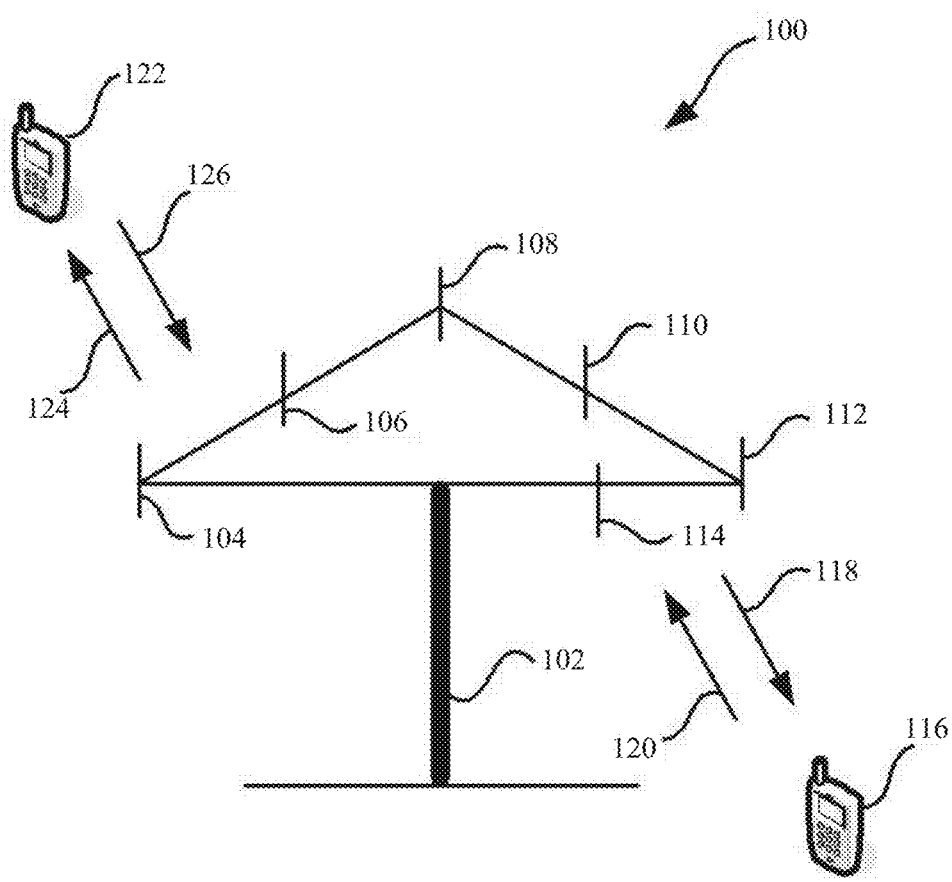
FIG. 2 is a schematic diagram of a communication system applicable to a wireless communication method in the present invention.

FIG. 2 is a schematic architectural diagram of a communication system 100 applicable to a wireless communication method in the present invention. As shown in FIG. 2, the communication system 100 includes a network device 102. The network device 102 may include multiple antennas, for example, antennas 104, 106, 108, 110, 112, and 114. In addition, the network device 102 may additionally include a transmitter chain and a receiver chain, and a person of ordinary skill in the art may understand that both the transmitter chain and the receiver chain may include multiple components (for example, a processor, a modulator, a multiplexer, a demodulator, a demultiplexer, and an antenna) related to signal sending and receiving.

The network device 102 may communicate with multiple terminal devices (for example, a terminal device 116 and a terminal device 122). However, it may be understood that, the network device 102 may communicate with any quantity of terminal devices similar to the terminal device 116 or 122. The terminal device 116 or 122 may be, for example, a cellular phone, an intelligent phone, a portable computer, a handheld communication device, a handheld computing device, a satellite radio apparatus, a global positioning system, a PDA, and/or any other appropriate device used for communication in the wireless communication system 100.

As shown in FIG. 2, the terminal device 116 communicates with the antennas 112 and 114. The antennas 112 and 114 send information to the terminal device 116 through a forward link 118, and receive information from the terminal device 116 through a reverse link 120. In addition, the terminal device 122 communicates with the antennas 104 and 106. The antennas 104 and 106 send information to the terminal device 122 through a forward link 124, and receive information from the terminal device 122 through a reverse link 126.

For example, in a frequency division duplex (FDD, Frequency Division Duplex) system, for example, the forward link 118 may use a band different from that used by the reverse link 120, and the forward link 124 may use a band different from that used by the reverse link 126.

For another example, in a time division duplex (TDD, Time Division Duplex) system and a full duplex (Full Duplex) system, the forward link 118 and the reverse link 120 may use a same band, and the forward link 124 and the reverse link 126 may use a same band.

Each antenna (or an antenna group including multiple antennas) and/or an area designed for communication are/is referred to as a sector of the network device 102. For example, an antenna group may be designed to communicate with a terminal device in a sector within coverage of the network device 102. In a process in which the network device 102 respectively communicates with the terminal devices 116 and 122 through the forward links 118 and 124, a transmit antenna of the network device 102 may improve signal-to-noise ratios of the forward links 118 and 124 by means of beamforming. In addition, compared with a manner in which the network device sends a signal to all terminal devices of the network device by using a single antenna, when the network device 102 sends, by means of beamforming, a signal to the terminal devices 116 and 122 that are distributed randomly within related coverage, less interference is caused to a mobile device in a neighboring cell.

At a given time, the network device 102, the terminal device 116, or the terminal device 122 may be a wireless communication sending apparatus and/or a wireless communication receiving apparatus. When sending data, the wireless communication sending apparatus may encode the data for transmission. Specifically, the wireless communication sending apparatus may obtain (for example, generate, receive from another communication apparatus, or store in a memory) a particular quantity of data bits that need to be sent to the wireless communication receiving apparatus through a channel. The data bit may be included in a transport block (or multiple transport blocks) of data, and the transport block may be segmented to produce multiple code blocks.

In addition, the communication system 100 may be a PLMN network or a device-to-device communication (D2D, Device-to-Device) network or a machine-to-machine communication (M2M, Machine to Machine) network or another network. FIG. 2 is only a simplified schematic diagram for example, and the network may further include another network device, not shown in FIG. 2.

FIG. 3 is a schematic flowchart of a wireless communication method 200 according to an embodiment of the present invention, which is described from the perspective of a terminal device. As shown in FIG. 3, the method 200 is performed in a communication system using at least two air interfaces, configuration information of the at least two air interfaces is different, the at least two air interfaces include a common air interface and at least one dedicated air interface, configuration information of the common air interface is preconfigured in a network device and a terminal device, and as shown in FIG. 3, the method 200 includes the following steps:

S210: The terminal device receives configuration information of a target dedicated air interface and indication information of a target transmission resource from the network device through the common air interface, where the target transmission resource is a transmission resource used by the target dedicated air interface.

S220: The terminal device performs wireless communication with the network device by using the target dedicated air interface and the target transmission resource.

Optionally, the configuration information includes at least one of a waveform parameter, a modulation scheme, a multiple access method, a bandwidth configuration, a radio frame configuration method, a resource multiplexing mode, a user scheduling mode, a channel configuration method, a coding scheme, or a protocol stack configuration method.

Specifically, in this embodiment of the present invention, the network device can provide multiple air interfaces, and the multiple air interfaces may refer to air interfaces whose at least one of the following parameters or information (that is, an example of configuration information) is different.

A. Waveform Parameter

A waveform parameter, or referred to as a parameter of a waveform, refers to a parameter that can indicate or determine a waveform.

By way of example, and not limitation, in this embodiment of the present invention, the waveform parameter may include at least one of the following parameters:

A1. a waveform parameter used in an orthogonal frequency division multiplexing (OFDM, Orthogonal Frequency Division Multiplexing) technology;

A2. a waveform parameter used in single-carrier frequency division multiple access (SC-OFDM, Single-carrier Frequency-Division Multiple Access);

A3. a waveform parameter used in a filter orthogonal frequency division multiplexing (filter OFDM, filter Orthogonal Frequency Division Multiplexing) technology;

A4. a waveform parameter used in a universal filtered multi-carrier (UFMC, Universal Filtered Multi-Carrier) technology;

A5. a waveform parameter used in a filter bank multicarrier (FBMC, Filter Bank Multicarrier) technology; or A6. a waveform parameter used in a generalized frequency division multiplexing (GFDM) technology.

B. Modulation Scheme

In a communication technology, to ensure a communication effect and overcome a problem in long-distance signal transmission, a signal spectrum needs to be shifted, by means of modulation, to a high frequency channel for transmission. A process of loading a to-be-sent signal onto a high frequency signal is referred to as modulation. By way of example, and not limitation, in this embodiment of the present invention, the modulation scheme may include at least one of the following schemes:

B1. amplitude shift keying (ASK) modulation;
B2. phase shift keying (PSK) modulation;
B3. frequency shift keying (FSK) modulation;
B4. quadrature amplitude modulation (QAM);
B5. minimum phase frequency shift keying (MSK) modulation;
B6. Gaussian minimum shift-frequency keying (GMSK) modulation; or
B7. OFDM modulation.

C. Bandwidth Configuration

In this embodiment of the present invention, a bandwidth configuration may refer to a used width of a frequency domain resource that is required by an air interface. By way of example, and not limitation, a bandwidth configuration corresponding to a broadband transmission service may refer to a minimum frequency domain resource bandwidth required by an air interface, or referred to as a quantity of subcarriers; a bandwidth configuration corresponding to a narrowband transmission service may refer to a maximum frequency domain resource width required by an air interface, or referred to as a quantity of subcarriers.

D. Radio Frame Configuration Method

The radio frame configuration method may include the following:

D1. a subcarrier spacing;
D2. a symbol length;
D3. a cyclic prefix (CP, Cyclic Prefix);
D4. a duplex mode, which, for example, may be classified into full duplex, half-duplex (including a half-duplex uplink-downlink configuration), or flexible duplex, where it should be noted that, in some air interfaces, the duplex mode may be fixed or may be changed flexibly, and this is not particularly limited in the present invention;
D5. a length of a transmission time interval (TTI, Transmission Time Interval), where it should be noted that, in some air interfaces, the transmission time interval may be a fixed value or may be changed flexibly, and this is not particularly limited in the present invention; and
D6. lengths of a radio frame and a radio subframe.

E. Resource Multiplexing Mode

By way of example, and not limitation, in this embodiment of the present invention, the resource multiplexing mode may include at least one of the following manners:

E1. frequency division multiplexing (FDM, Frequency Division Multiplexing), that is, a total bandwidth used for channel transmission is divided into several subbands (or referred to as sub-channels), where one signal is transmitted on each sub-channel; frequency division multiplexing requires that the total bandwidth be greater than a sum of frequencies of the sub-channels, and to ensure that no mutual interference is caused to signals transmitted on the sub-channels, isolation belts should be set between the sub-channels; in this ways it is ensured that no mutual interference is caused to the signals (one condition);

E2. time division multiplexing (TDM, Time Division Multiplexing), that is, different signals are transmitted by using different time periods of a same physical connection, which can also implement multipath transmission, where in time division multiplexing, a time is used as a parameter for signal division; therefore, signals need to be independent of each other in a timeline; and time division multiplexing is to divide a time provided for information transmission on an entire channel to several time slices (referred to as timeslots for short), and allocate the timeslots to each signal source for use;

E3. space division multiplexing (SDM, Space Division Multiplexing), that is, a same band is reused in different spaces, where in mobile communication, a basic technology that can implement space division is using an adaptive array antenna to form different beams in different user directions; and different users may be distinguished by means of space division, or for each beam, a unique channel that is not interfered by another user may be provided, or different data of a same user may be distinguished by means of space division, or same data of a same user may be distinguished by means of space division, to obtain a higher gain; or E4. code division multiplexing (CDM, Code Division Multiplexing), that is, a multiplexing manner for distinguishing original signals by means of different encoding, where by way of example, and not limitation, code division multiple access (CDMA, Code Division Multiple Access), frequency division multiple access (FDMA, Frequency Division Multiple Access), time division multiple access (TDMA, Time Division Multiple Access), and synchronous code division multiple access (SCDMA, Synchronous Code Division Multiple Access) may be listed.

G. Channel Configuration Method

In this embodiment of the present invention, different channels may be used to transmit different types of data or signals, so that the channel configuration method may refer to a time-frequency resource, a code domain resource, or a space domain resource (such as a specified beam) corresponding to a channel.

By way of example, and not limitation, in this embodiment of the present invention, a channel used in wireless communication may include at least one of the following channels or a combination of multiple channels of the following channels:

G1. a control channel, used to transmit control information, which, for example, may include an uplink control channel and a downlink control channel;

G2. a data channel, used to transmit data, which, for example, may include an uplink data channel and a downlink data channel;

G3. a reference channel, used to transmit a reference signal; and

G4. an access channel, used to send access information.

H. Coding Scheme

Encoding is conversion performed on a signal source symbol to improve communication effectiveness, or is conversion performed on a signal source symbol to reduce or eliminate signal source redundancy. Specifically, for a statistical characteristic of a signal source output symbol sequence, a method is sought for to convert the signal source output symbol sequence into a shortest codeword sequence, to enable an average amount of information loaded by code elements of the codeword sequence to be the largest, and ensure that the original symbol sequence can be restored without distortion.

By way of example, and not limitation, in this embodiment of the present invention, the coding scheme may be listed as follows:

H 1. polar code;

H 2. Turbo code; and

H 3. convolution code.

I. Protocol Stack Configuration Method

A protocol stack refers to a set of protocols at layers in a network, and visually reflects a file transmission process in the network: from a higher-level protocol to a lower-level protocol, and then from the lower-level protocol to the higher-level protocol. By way of example, and not limitation, in this embodiment of the present invention, a protocol stack used in wireless communication may include at least one of the following protocol layers or a combination of multiple protocol layers of the following protocol layers, where a protocol at each layer may have multiple protocol entities:

I 1. a Packet Data Convergence Protocol (PDCP) layer;

I 2. a Radio Link Control (RLC) layer;

I 3. a Media Access Control (MAC) layer;

I 4. a physical (Physical) layer; and

I 5. a Radio Resource Control (RRC) layer.

J. Multiple Access Method

Different from multiplexing, in a multiple access technology, various pieces of information do not need to be centralized but are respectively modulated to channels, and required information obtained through modulation is obtained from the channels respectively. By way of example, and not limitation, in this embodiment of the present invention, a multiple access method used in wireless communication may include at least one of the following:

J1. FDMA;

J2. TDMA;

J3. CDMA;

J4. SCMA;

J5. non-orthogonal multiple access (NOMA); or

J6. multi-user shared access (MUSA).

It should be understood that, specific content included in the configuration information listed above is merely for illustration purposes, and the present invention is not limited thereto. A parameter and information that can be determined by a network device and a terminal device in a predefined manner in the prior art shall all fall within the protection scope of the configuration information in the present invention. In this embodiment of the present invention, the network device and the terminal device can support multiple (two or more) air interfaces, or can perform wireless communication by using multiple air interfaces, where at least one parameter or at least one piece of information in the configuration information listed above of the multiple air interfaces is different.

In addition, in this embodiment of the present invention, quantities and types of air interfaces that can be supported by the network device and the terminal device may be the same or may be partially different. This is not particularly limited in the present invention. "Being partially different" means that there is an intersection set of air interfaces supported by the network device and air interfaces supported by the terminal device, that is, the network device and the terminal device both support an air interface in the intersection set, and the intersection set includes at least two air interfaces.

In this embodiment of the present invention, multiple air interfaces used by the communication system (that is, the network device and the terminal device) include a common air interface and a dedicated air interface.

Configuration information of the common air interface is preset in the network device and the terminal device, that is, the network device and the terminal device can perform communication based on the configuration information.

In addition, there may be one or more dedicated air interfaces. This is not particularly limited in the present invention. In addition, the network device and the terminal device cannot directly perform communication based on the dedicated air interface.

That "the network device and the terminal device cannot directly perform communication based on the dedicated air interface" may include the following definitions:

α. Configuration information of the dedicated air interface is configured in neither the network device nor the terminal device. In this case, when the network device and the terminal device need to perform wireless communication by using the dedicated air interface, a higher layer management device needs to deliver the configuration information of the dedicated air interface to the network device, and the network device delivers, to the terminal device through the common air interface, the configuration information of the dedicated air interface and indication information of a transmission resource used by the dedicated air interface, so that the network device and the terminal device can complete wireless communication based on the dedicated air interface.

β. Configuration information of the dedicated air interface is stored in the network device, but the configuration information of the dedicated air interface is not stored in the terminal device. In this case, when the network device and the terminal device need to perform wireless communication by using the dedicated air interface, the network device may deliver, to the terminal device through the common air interface, the configuration information of the dedicated air interface and indication information of a transmission resource used by the dedicated air interface, so that the network device and the terminal device can complete wireless communication based on the dedicated air interface.

γ. Configuration information of the dedicated air interface is stored in the terminal, but the configuration information of the dedicated air interface is not stored in the network device. In this case, when the network device and the terminal device need to perform wireless communication by using the dedicated air interface, the terminal device may send the configuration information of the dedicated air interface to the network device through the common air interface, and the network device notifies the terminal device of a transmission resource used by the dedicated air interface, so that the network device and the terminal device can complete wireless communication based on the dedicated air interface.

η. Configuration information of one or more dedicated air interfaces is stored in the network device, and configuration information of one or more dedicated air interfaces is stored in the terminal device, but neither the network device nor the terminal device knows a dedicated air interface that is used by an opposite party or that an opposite party expects to use. In this case, the network device and the terminal device may determine, through negotiation, configuration information and a transmission resource of a professional air interface supported by both the network device and the terminal device, and perform wireless communication based on the determined dedicated air interface.

δ. Configuration information of one or more dedicated air interfaces is stored in the network device, configuration information of one or more dedicated air interfaces is stored in the terminal device, and the terminal device does not support at least one dedicated air interface of the network device. In this embodiment of the present invention, the common air interface may select a relatively common configuration in an existing communication network, or an air interface whose configuration information is commonly stored or configured by default in an existing terminal device or network device may be used as the common air interface. By way of example, and not limitation, the common air interface may use a configuration of an air interface specified in LTE R8, thereby improving commonality and applicability of the wireless communication method in this embodiment of the present invention.

Specific network elements providing various air interfaces are described below.

In this embodiment of the present invention, various air interfaces may be provided by one network device (for example, a base station).

By way of example, and not limitation, for example, a terminal device j and a terminal device k are respectively a terminal accessing a mobile broadband service and a terminal accessing an ultra short delay service, and are within coverage of a same network device. The network device can use a spectrum resource of a bandwidth of 200 MHz, and supports both the mobile broadband service and the ultra short delay service.

At a center frequency of 200 M, a time-frequency resource used by a common air interface of a bandwidth of 1 MHz is deployed, a radio frame sending period of the common air interface is 1 ms, and a length of a subframe is 0.5 ms. The common air interface uses an OFDM scheme, a subcarrier spacing is 15 kHz, one subframe includes 10 symbols, duration of each symbol is 0.05 ms, and a cyclic prefix of each symbol is 0.01 ms. In the common air interface, a synchronization channel is sent on a synchronization signal at the beginning of each period of 1 ms, a broadcast channel follows the synchronization signal, and QPSK modulation is used.

A time-frequency resource of a dedicated air interface j occupies a bandwidth of 180 MHz in a high band.

A time-frequency resource of a dedicated air interface k occupies a bandwidth of 20 MHz in a low band.

In addition, configuration information of the dedicated air interface j and the dedicated air interface k may be shown in the following Table 1.

TABLE 1

| Configuration information index | Waveform parameter | Radio frame configuration | Multiple access method | Channel configuration |
| --- | --- | --- | --- | --- |
| Dedicated air interface j | Filter OFDM | Subcarrier spacing 1 Symbol length 1 CP length 1 TTI length 1 ms | OFDMA Centralized scheduling | Control channels are located on the highest and lowest N subcarriers of an air interface 1, and occupy one subframe. |
| Dedicated air interface k | Filter OFDM | Subcarrier spacing 2 Symbol length 2 CP length 2 TTI length 0.2 ms | OFDMA Centralized scheduling | A first symbol of a subframe is a control channel, and the rest are data channels |

The foregoing configuration information of the common air interface is configured by default, and is set in the terminal device (for example, the terminal device j and the terminal device k) and the network device in a predefined manner. The terminal device j and the terminal device k search a spectrum for a synchronization signal according to the foregoing default configuration, to complete synchronization of a frequency and a time, and read broadcast information in the common air interface. The terminal may learn, by using the broadcast information, a total bandwidth of 200 MHz of the base station, and the configuration information of the dedicated air interface j and the dedicated air interface k. The terminal device j may learn, from broadcast of the common air interface, that the dedicated air interface j supports the mobile broadband service, and the terminal device k learns, from broadcast of the common air interface, that the dedicated air interface k supports the ultra short delay service. The terminal device j and the terminal device k respectively learn, from the common air interface, the configuration information of the dedicated air interface j and the dedicated air interface k shown in Table 1 and Table 2 and time-frequency resources used by the dedicated air interface j and the dedicated air interface k. To reduce signaling, a configuration information index of a dedicated air interface may be sent only in the common air interface, and the terminal obtains configuration information from a predefined configuration table by using an index. The configuration table may be predefined in the terminal device j and the terminal device k by using a protocol, or the terminal device j and the terminal device k may obtain the configuration table from the network device. This is not particularly limited in the present invention.

The terminal device j and the terminal device k learn that for the dedicated air interface j and the dedicated air interface k, a synchronization signal is sent through the common air interface, and determine a subframe border of a corresponding air interface by using the synchronization signal in the common air interface. The terminal device j and the terminal device k respectively obtain system broadcast of the dedicated air interface j and the dedicated air interface k through a broadcast channel of the common air interface. The system broadcast information may include cell identifier information. The common air interface, the dedicated air interface j, and the dedicated air interface k may use a same cell identifier or may use different cell identifiers. For a same cell identifier, the cell identifier only needs to be carried in broadcast of the common air interface once. For different cell identifiers, different air interfaces belong to different cells logically. Respective broadcast information of air interfaces may further include air interface access control information, public channel configuration information, neighboring cell information, and the like. In this embodiment, system broadcast of different air interfaces is sent by using different system broadcast blocks, or broadcast blocks are identified and distinguished by using different physical layer identifiers. The terminal obtains system broadcast information of a required air interface by using an indication in the common air interface.

The terminal device j and the terminal device k may perform measurement in corresponding air interfaces, and may perform random access, establish Radio Resource Control (RRC, Radio Resource Control) connections, send service requests, and establish corresponding services in the corresponding air interfaces. For the common air interface, a public random access channel may be configured, so that all terminals first perform access by using the public random access channel, and then receive random access responses in respective air interfaces, to complete a random access process. Other public signaling, for example, paging may be configured in the common air interface for completion. Further, a scheduling command of each air interface may be sent through a control channel of the common air interface, to dynamically instruct the terminal and an air interface corresponding to the terminal to perform data transmission on a dynamic time-frequency resource.

To reduce load of the common air interface, only entrance configuration information of each dedicated air interface, for example, a synchronization channel configuration or broadcast channel configuration information may be indicated in the common air interface. If each dedicated air interface has a respective broadcast channel, configuration information (a center frequency, a channel bandwidth, received a modulation and coding configuration, an antenna configuration, and the like) of a primary broadcast channel of each dedicated air interface is indicated in the common air interface, to instruct the terminal device to receive a public configuration from a corresponding dedicated air interface.

In addition, the network device may dynamically deploy a dedicated air interface. For example, the network device may reserve some time-frequency resources. For a newly accessing terminal device (for ease of understanding and distinguishing, denoted as a terminal device h) that needs to access other services (for example, a service requiring a huge quantity of connections) than the mobile broadband service and the ultra short delay service, when the terminal device h needs to access a service, the terminal device h performs access by using a random access channel of the common air interface, and requests the service requiring a huge quantity of connections from the network device. The network device allocates a dedicated air interface h that can satisfy the service requiring a huge quantity of connections, allocates the previously reserved time-frequency resource to the dedicated air interface h, and sends configuration information and a used time-frequency resource of a dedicated air interface h to the terminal device h in the common air interface, to indicate, from the common air interface, that the terminal device h can access the dedicated air interface h to perform the service requiring a huge quantity of connections.

Alternatively, various air interfaces may be provided by multiple network elements that cooperate to implement functions of the network device.

Optionally, the network device includes a macro station and a micro station, the macro station performs wireless communication by using the common air interface, and the micro station performs wireless communication by using the dedicated air interface.

Specifically, as shown in FIG. 4, the method 200 may be applied to a communication system of the network device including a macro station (or referred to as a macro base station) and a micro station (or referred to as a micro base station). In this case, the macro station serves as basic coverage, several micro stations perform hotspot coverage, the common air interface is provided by the macro station, the dedicated air interface may be provided by the micro station, and the macro station and the micro station negotiate a time-frequency resource used by an air interface (for example, the dedicated air interface). For example, the micro station may report a use requirement for the time-frequency resource, and the macro station allocates an available time-frequency resource to the micro station.

It should be noted that, in this embodiment of the present invention, a quantity of dedicated air interfaces that can be provided by each micro station is not particularly limited, as long as it can be ensured that transmission resources used by air interfaces (including a common air interface and a dedicated air interface) do not conflict with each other (subsequently, allocation manners of the transmission resources of the air interfaces are described in detail).

In addition, if different micro stations provide different dedicated air interfaces, each micro station may send a synchronization signal and a measurement reference signal of a corresponding dedicated air interface, and may also send a paging signal for a dedicated air interface that needs to support a paging function.

By way of example, and not limitation, it is assumed that a terminal device n and a terminal device m are respectively a terminal device accessing the mobile broadband service and a terminal device accessing the ultra short delay service, a dedicated air interface n can support the mobile broadband service, a dedicated air interface m can support the ultra short delay service, and the terminal device n and the terminal device m are within coverage of a same macro station.

By means of synchronization with the common air interface, the terminal device n and the terminal device m can receive broadcast sent through the common air interface, where configuration information and used time-frequency resources of the dedicated air interface n and the dedicated air interface m are sent. A micro station n and a micro station m can support one or two of the dedicated air interface n and the dedicated air interface m. The terminal device n and the terminal device m search, according to the configuration information of the dedicated air interface obtained from the common air interface, for signals that are sent by the micro station n and the micro station m in an air interface supported by the micro station n and the micro station m. For example, in this embodiment, the terminal device n finds a synchronization signal of the dedicated air interface n sent by the micro station n, and then performs synchronization with the dedicated air interface n provided by the micro station n, reads corresponding broadcast information, and obtains a configuration such as a cell identifier, access control information, common resource configuration information, or neighboring cell information of the dedicated air interface n provided by the micro station n. The terminal device n receives a common channel configuration and a reference signal configuration, such as system broadcast or paging of the dedicated air interface n provided by the micro station n, to perform channel measurement, or may access the micro station n on a corresponding random access channel, to request a service connection. The terminal device n may maintain synchronization with both the common air interface and the dedicated air interface n, and may receive a broadcast change indication of the common air interface.

Similarly, the terminal device m can find the micro station supporting the dedicated air interface m to perform corresponding wireless communication.

For example, when a current dedicated air interface cannot meet a service requirement of a newly accessing terminal device p, the terminal device p may access a network through the common air interface, and request the network (for example, a macro station) to deploy a dedicated air interface p that can support the service requirement of the terminal device p, and the request may carry current location information of the terminal device p or information about a current surrounding radio air interface, for example, information about a dedicated air interface provided by a surrounding micro station that can be found by the terminal device p, for example, an identifier of the dedicated air interface n provided by the micro station n, so that the network device can configure a dedicated air interface p according to the request of the terminal device p in a micro station (for ease of understanding and distinguishing, denoted as a micro station P) whose coverage can cover a current location of the terminal device p, so that the terminal device p can perform wireless communication based on the dedicated air interface p provided by the micro station P, to implement service access.

Optionally, the communication system includes multiple micro stations, each micro station performs wireless communication by using the common air interface, and the network device is a micro station whose coverage covers a location of the terminal device.

Specifically, as shown in FIG. 5, the method 200 may be applied to a communication system of the network device including multiple micro stations (or referred to as micro base stations). In this case, a central control network element on the cloud performs management and control on each micro station. To ensure that the common air interface can be deployed in each micro station within coverage of the common air interface, the central control network element uniformly indicates configuration information such as a center frequency or broadcast information of the common air interface of each micro station. Each micro station may use a technology for synchronizing network broadcast, that is, downlink signals of the common air interface that are synchronously sent by all the micro stations in air interfaces, to improve coverage of the common air interface, so as to form a virtual common air interface with relatively coverage, and receive, on a same resource, a signal that is sent by the terminal device in the common air interface, which is uniformly processed by the central control network element or the macro station.

A dedicated air interface may be uniformly managed by the central control network element, or may be separately managed by a micro station according to a resource status of the micro station.

For example, if a terminal device s performs access by using a virtual common air interface and requests the ultra short delay service, the central control network element deploys, according to the service requirement, in a micro station s whose coverage can cover a location of the terminal device s, a dedicated air interface s that can support the ultra short delay service, and instructs, through the common air interface, the terminal device s to access the micro station s, so that the terminal device s can learn configuration information and a used time-frequency resource of the dedicated air interface s by using broadcast information of the common air interface, and perform wireless communication with the micro station s, to perform service access.

An allocation status of a transmission resource of each air interface is described in detail below.

Figure 6:
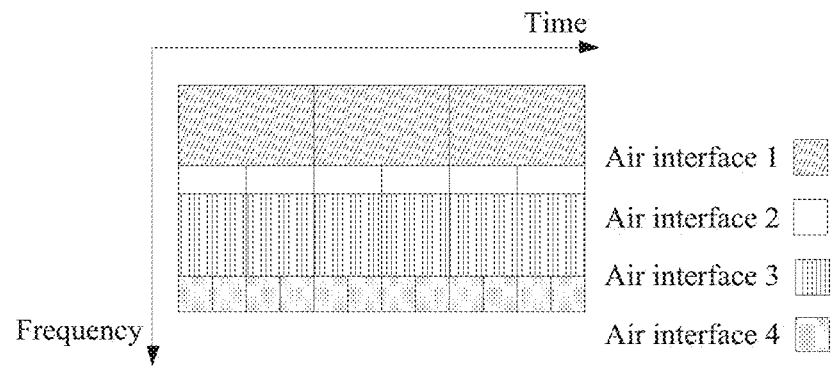
FIG. 6 is a schematic diagram of a solution for allocating time-frequency resources used by multiple air interfaces according to an embodiment of the present invention.
Figure 7:
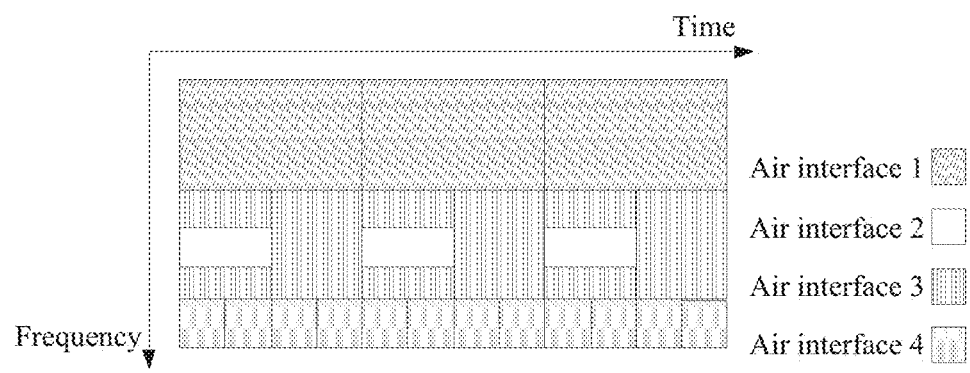
FIG. 7 is a schematic diagram of a solution for allocating time-frequency resources used by multiple air interfaces according to another embodiment of the present invention.
Figure 8:
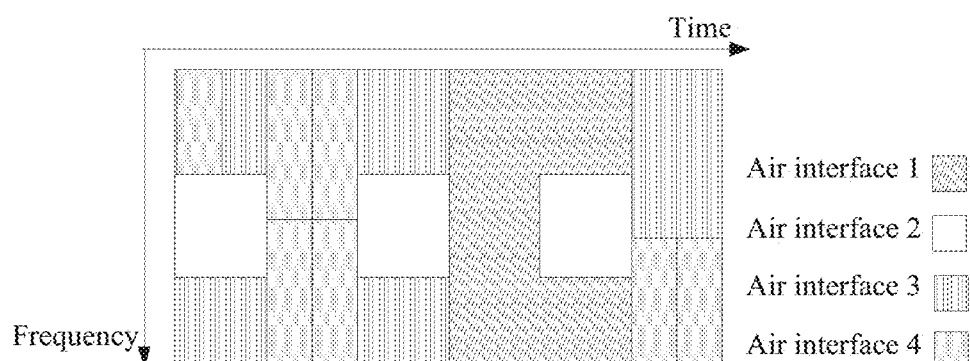
FIG. 8 is a schematic diagram of a solution for allocating time-frequency resources used by multiple air interfaces according to still another embodiment of the present invention.

In this embodiment of the present invention, the common air interface and the at least one professional air interface exist, and each air interface uses a time-frequency resource provided by a system for transmission. Therefore, to avoid mutual interference to communication in the air interfaces, different air interfaces may use different time-frequency resources for communication. With reference to FIG. 6 to FIG. 8, allocation of a time-frequency resource used by each air interface is described below.

Optionally, for the embodiments of the present patent application, a "common air interface" and a "dedicated air interface" that are described may be considered as a manner of describing different air interfaces. A "common air interface" and a "dedicated air interface" may be understood as two different air interfaces, for example, understood as that: a "common air interface" is a first type of air interface, and a "dedicated air interface" is a second type of air interface. Different air interfaces may be applied to different numerology. The numerology generally refers to numerology of a communication technology, and specifically refers to a parameter configuration related to the communication technology, for example, including but not limited to: a subcarrier spacing or a cyclic prefix format.

For different air interfaces, a terminal-side device and a network-side device may use different wireless transmission specifications or access modes. If both the network-side device and the terminal-side device can support multiple pieces of numerology at the same time, a synchronization channel may be located in a subband corresponding to a baseline subcarrier spacing of 15 KHz, or may be located in another subband.

The terminal-side device may alternatively receive configuration information through any air interface supported by the terminal-side device. For example, the terminal-side device supports a first air interface and a second air interface. In this case, the terminal-side device may receive configuration information of the second air interface and indication information of a target transmission resource from the network device through the first air interface supported by the terminal-side device, where the target transmission resource is a transmission resource used by the target second air interface; and the terminal device performs wireless communication with the network device by using the target second air interface and the target transmission resource. Alternatively, the terminal-side device may receive configuration information of the first air interface and indication information of a target transmission resource from the network device through the second air interface, where the target transmission resource is a transmission resource used by the target first air interface; and the terminal device performs wireless communication with the network device by using the target first air interface and the target transmission resource.

Alternatively, the terminal-side device may receive configuration information of an air interface through the air interface.

For ease of understanding and description without loss of generality, resource allocation manners of four air interfaces (that is, an air interface 1 to an air interface 4) are shown in FIG. 6 to FIG. 8.

As shown in FIG. 6 to FIG. 8, a length of a subframe of the air interface 4 is the shortest, and the air interface 4 is applicable to a short delay service. Lengths of subframes of the air interface 2 and the air interface 3 are the same, but a bandwidth of a frequency occupied by the air interface 2 is low. A bandwidth of a frequency occupied by the air interface 3 is high (for example, a subcarrier spacing used by the air interface 2 is small, and a subcarrier spacing used by the air interface 3 is large). A length of a subframe of the air interface 1 is the longest.

In a resource allocation manner shown in FIG. 6, different air interfaces share, by means of frequency division, a frequency resource provided by a system.

In a resource allocation manner shown in FIG. 7, the air interface 2 and the air interface 3 share a same frequency resource in some frequencies, and a time-frequency resource occupied by the air interface 2 is not used by the air interface 3. When the terminal does not support the air interface 2, according to a time-frequency resource configuration corresponding to the air interface 2, the terminal does not perform receiving or sending through the air interface 2, so that after a new air interface is added subsequently, an original terminal is not affected.

In a resource allocation manner shown in FIG. 8, the air interface 2 periodically occupies a fixed frequency resource statically or semi-statically, and the other three air interfaces dynamically occupy a remaining time-frequency resource as scheduled.

As can be learned, multiple air interfaces may flexibly share, by means of time division or frequency division, a frequency resource provided by a system, so that different service or deployment requirements can be met by using the frequency resource provided by the system.

It should be understood that, use manners of time-frequency resources shown in FIG. 6 to FIG. 8 listed above are merely for illustration purposes, and the present invention is not limited thereto. For example, in the use manners of the time-frequency resources shown in FIG. 6 to FIG. 8, subframe configurations of the air interfaces are different, and for other configuration information, different air interfaces may also be configured differently according to requirements of the different air interfaces. Herein, to avoid repeated descriptions, detailed descriptions are omitted.

Figure 9:
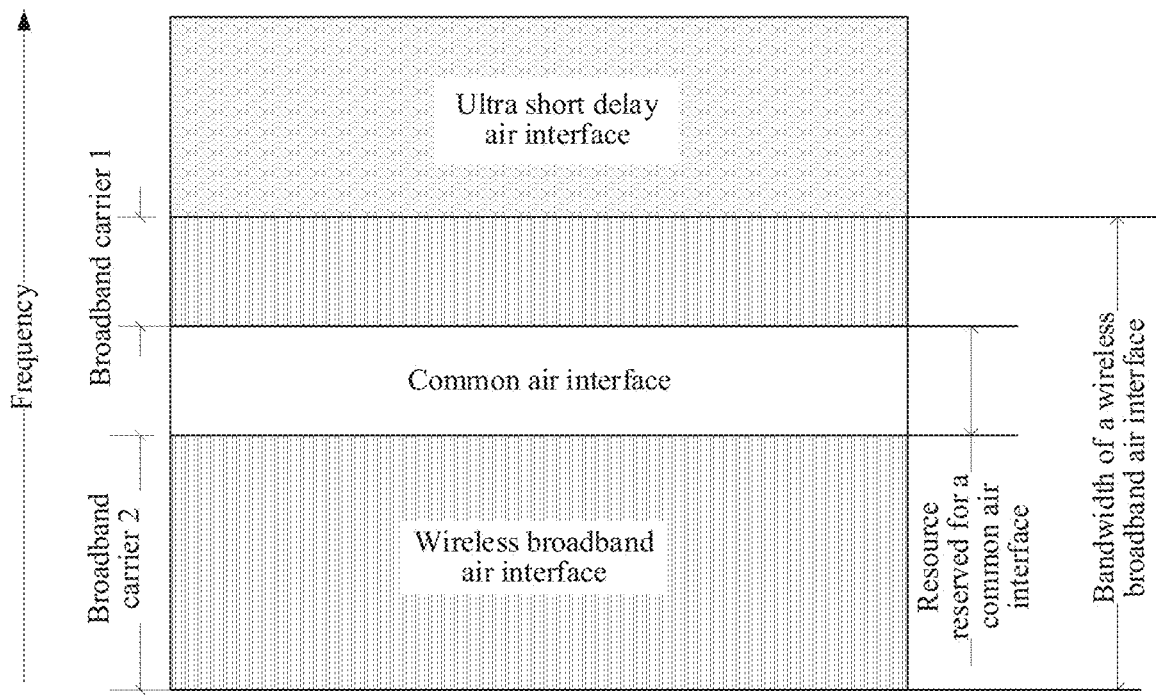
FIG. 9 is a schematic diagram of a solution for allocating time-frequency resources used by multiple air interfaces according to still another embodiment of the present invention.
Figure 10:
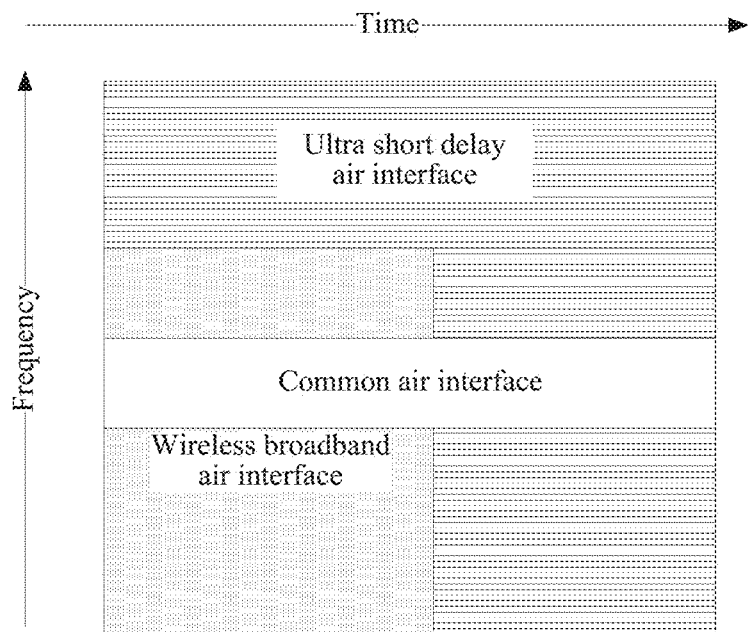
FIG. 10 is a schematic diagram of a solution for allocating time-frequency resources used by multiple air interfaces according to still another embodiment of the present invention.

FIG. 9 and FIG. 10 show resource allocation manners of air interfaces corresponding to different service types.

As shown in FIG. 9, due to great demands in a radio spectrum, multiple segments of non-consecutive spectrums may be allocated for use by a wireless broadband air interface. For the wireless broadband air interface, wireless broadband may be considered as two segments of spectrums, for example, a broadband carrier 1 and a broadband carrier 2 shown in FIG. 9, which are used by means of carrier aggregation or in a multi-connection manner.

In another manner, it may be considered that an entire segment is consecutive carriers or virtual consecutive carriers. A resource occupied by a common air interface is not used as a reversed resource during processing at a physical layer. In this embodiment, for an ultra short delay air interface, consecutive bandwidths are allocated, and no special processing needs to be performed. If non-consecutive bandwidths are allocated, it may be processed as a same case. Sending configuration information of one air interface through a broadcast channel includes: if the air interface includes multiple carriers, sending, based on the carriers, center frequency information of each carrier or an offset relative to a center frequency of the common air interface (the offset may be indicated by an offset Hertz Hz, a quantity of offset subcarriers, or a quantity of offset PRBs).

As shown in FIG. 10, different air interfaces may alternatively multiplex a same spectrum resource by means of time division. As described above, a wireless bandwidth air interface and an ultra short delay air interface may use a same band but different time. Time information is indicated by a radio frame, a subframe, or a quantity of subframes in a radio frame used by a common air interface or an absolute time length.

In this embodiment of the present invention, a time-frequency resource used by the common air interface may be pre-allocated or configured by default, so that the network device and the terminal device can perform wireless communication according to a requirement by using the common air interface and the default time-frequency resource used by the common air interface.

In addition, in this embodiment of the present invention, a time-frequency resource of each dedicated air interface may be pre-allocated or may be dynamically allocated by the network device or a higher layer management device according to a service requirement of the terminal device. For example, a corresponding dedicated air interface is deployed only when a service is coming, that is, on-demand (on-demand) deployment (for example, delivery of configuration information of the dedicated air interface and a time-frequency resource allocated for use by the dedicated port) is performed. When there is no service requirement, the dedicated air interface may be not deployed, so as to save a resource for use by another air interface.

In this embodiment of the present invention, there may be one or more terminal devices. This is not particularly limited in the present invention. For ease of understanding and description without loss of generality, a process in which a terminal device # A performs wireless communication by using the wireless communication method 200 in this embodiment of the present invention is described in detail.

The network device may send, based on the prestored configuration information of the common air interface by using a pre-allocated transmission resource (for example, a time-frequency resource) used by the common air interface, for example, a pilot signal, a synchronization signal, or a preamble used by the terminal device to perform blind detection.

By way of example, and not limitation, in this embodiment of the present invention, time-frequency resources used by the common air interface may be non-consecutive radio frames, thereby reducing occupation of a resource by the common air interface, and reducing power consumption of the network device.

The terminal device # A may detect a radio frame based on the prestored or default configuration information of the common air interface, to obtain the foregoing pilot signal, synchronization signal, or preamble, and further determine the transmission resource used by the common air interface.

It should be noted that, in this embodiment of the present invention, air interfaces of different network devices are defined as conception of cells for distinguishing. The terminal device searches for a cell by using a synchronization signal of the cell, may determine, by using the synchronization signal, information such as physical layer cell identifier information (PCI, Physical-layer Cell Identity) of the cell, or a subframe border of the cell for receiving information from the cell subsequently. In LTE, to reduce detection complexity, the synchronization channel may further include a primary synchronization channel and a secondary synchronization channel, used for determining a subframe border of a common air interface of a sending node and performing public downlink synchronization when all nodes receiving a signal from a cell perform search in an air interface.

Figure 11:
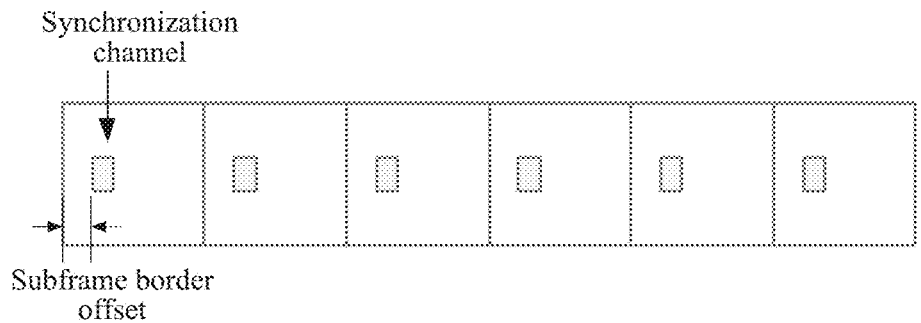
FIG. 11 is a schematic diagram of a synchronization channel configuration method for a common air interface according to still another embodiment of the present invention.

As shown in FIG. 11, in this embodiment of the present invention, a subframe border offset may be predefined (for example, default or preconfigured), the subframe border offset may refer to an offset between a subframe border of a subframe used by the common air interface and a synchronization channel used by the common air interface, so that after obtaining a synchronization signal through blind detection, the terminal device may determine the synchronization channel, and further determine the subframe border of the subframe used by the common air interface.

In addition, in this embodiment of the present invention, a value of the subframe border offset may be set randomly, for example, may be set to 0, that is, a signal on the synchronization channel is the subframe border of the common air interface from the beginning. When the synchronization channel satisfies a synchronization progress in a frequency domain, a relatively small quantity of frequency domain resources are occupied, to lower a receiving capability requirement of a receiving node.

Figure 12:
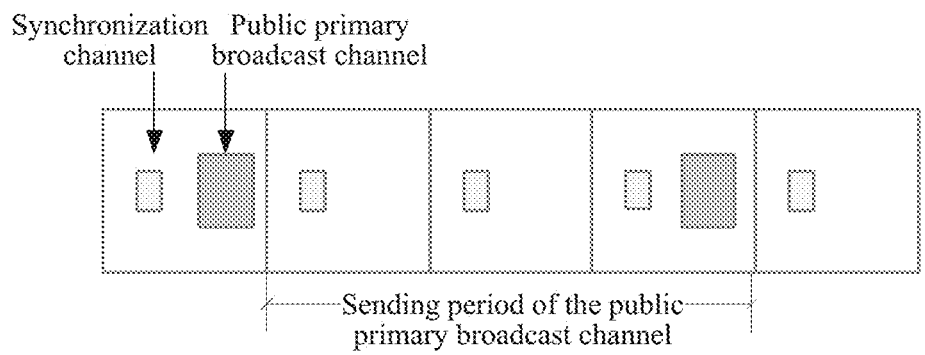
FIG. 12 is a schematic diagram of a public primary broadcast channel configuration method for a common air interface according to still another embodiment of the present invention.

As shown in FIG. 12, in this embodiment of the present invention, for the common air interface, for example, a radio frame number of the common air interface, a bandwidth of the common air interface, a control channel configuration of the common air interface, a sending period of a synchronization signal, a sending period of a public primary broadcast channel, a change period of the public primary broadcast channel, a public broadcast channel configuration, a public paging channel configuration, public measurement reference signal configuration information, and random access channel configuration information of the common air interface are sent through the public primary broadcast channel.

In a time domain, a start location of the public primary broadcast channel may be determined based on the determined subframe border by using an offset between the start location of the public primary broadcast channel and the subframe border that is indicated by the configuration information of the common air interface; or a start location of the public primary broadcast channel may be determined based on the determined synchronization channel by using an offset between the start location of the public primary broadcast channel and the synchronization channel that is indicated by the configuration information of the common air interface. In addition, in this embodiment of the present invention, duration occupied by the public primary broadcast channel may be indicated by the configuration information of the common air interface, for example, N milliseconds or M symbols may be occupied, where N≥1, and M≥1.

In the frequency domain, center frequency locations of the public primary broadcast channel and the synchronization channel may be the same, and a bandwidth may be indicated by the configuration information of the common air interface. For example, X physical resource blocks (PRB, physical resource block) or Y subcarriers are occupied, where X≥1, and Y≥1.

Therefore, the network device and the terminal device may perform data transmission by using a modulation and coding scheme and a bit rate that are indicated by the configuration information of the common air interface.

Figure 13:
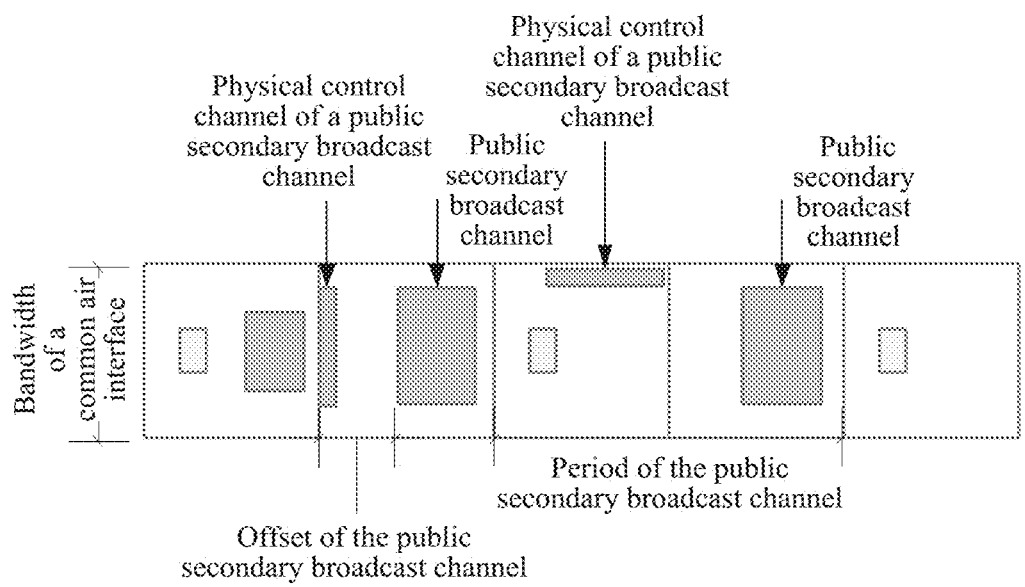
FIG. 13 is a schematic diagram of a public secondary broadcast channel configuration method for a common air interface according to still another embodiment of the present invention.

As shown in FIG. 13, in this embodiment of the present invention, for the common air interface, for example, a radio frame number used by the common air interface, a bandwidth of the common air interface, a period of a public secondary broadcast channel, a subframe offset, a bandwidth occupied by the public secondary broadcast channel, and a physical control channel configuration of the public secondary broadcast channel may alternatively be sent through the public secondary broadcast channel.

It should be noted that, when the public secondary broadcast channel is configured, a related configuration of the public secondary broadcast channel may be further sent on the public primary broadcast channel.

In addition, multiple different types of broadcast blocks may be sent on the public secondary broadcast channel, sending configuration information of different broadcast blocks may be sent on the public primary broadcast channel, or a configuration of a broadcast block of a type 1 may be sent on the public primary broadcast channel, and the broadcast block of the type 1 is used to send a configuration of a broadcast block of another type. Different broadcast blocks are distinguished by physical layer identifier information or identifier information in the broadcast blocks, so as to reduce occupation on the public primary broadcast channel.

Therefore, in this embodiment of the present invention, the network device and the terminal device # A may send, through the broadcast channel (for example, including the public primary broadcast channel and the public secondary broadcast channel) of the specified common air interface, configuration information of a professional air interface (that is, a target dedicated air interface for the terminal device # A) corresponding to related information of the terminal device # A.

In this embodiment of the present invention, the dedicated air interface may be determined by the network device (that is, a manner 1) or may be determined by the terminal device # A (that is, a manner 2). Specific processes of the foregoing two manners are respectively described in detail below.

Manner 1

Optionally, the target dedicated air interface is determined by the network device in the at least one dedicated air interface according to related information of the terminal device, and the related information of the terminal device includes at least one of a service type of a service accessed by the terminal device, mobility of the terminal device, or a transmission rate requirement of the terminal device.

Specifically, in this embodiment of the present invention, the network device may obtain the related information of the terminal device # A. In addition, by way of example, and not limitation, the related information of the terminal device # A may include one or more of the following information:

1. Service Type

Specifically, the service type is a service type of a service (for ease of understanding and distinguishing, denoted as a service # A below) to be accessed by the terminal device # A. By way of example, and not limitation, for example, if the service type of the service # A is, for example, a short delay service such as an online game, an air interface (for example, the air interface 4 in FIG. 6 to FIG. 8) whose length of a subframe is relatively short may be used as the target dedicated air interface for the terminal device # A; and for another example, if the service type of the service # A is, for example, a service with a high bandwidth requirement such as media transmission, an air interface (for example, the air interface 1 in FIG. 6 to FIG. 8) whose length of a subframe is relatively long may be used as the target dedicated air interface for the terminal device # A.

2. Mobility

Specifically, the mobility is mobility of the terminal device # A. By way of example, and not limitation, for example, if the mobility of the terminal device # A is relatively high, an air interface whose length of a CP is relatively long may be used as the target dedicated air interface for the terminal device # A; and for another example, if the mobility of the terminal device # A is relatively low, an air interface whose length of a CP is relatively short may be used as the target dedicated air interface for the terminal device # A.

3. Transmission Rate Requirement

Specifically, the transmission rate requirement is a transmission rate requirement of the terminal device # A, and for example, may be determined according to a user priority or a payment status of the terminal device # A. By way of example, and not limitation, for example, if the transmission rate requirement of the terminal device # A is relatively high, an air interface of a high bandwidth may be used as the target dedicated air interface for the terminal device # A; and for another example, if the transmission rate requirement of the terminal device # A is relatively low, an air interface of a low bandwidth may be used as the target dedicated air interface for the terminal device # A.

It should be understood that, the manner in which the network device determines the target dedicated air interface for the terminal device # A listed above is merely for illustration purposes, and the present invention is not limited thereto. Other methods and processes that can be used to determine an air interface applicable to a terminal device shall all fall within the protection scope of the present invention. For example, the target dedicated air interface for the terminal device # A may alternatively be determined according to a congestion status of a current system.

Optionally, the method further includes:

sending, by the terminal device, the related information of the terminal device to the network device through the common air interface.

Specifically, in this embodiment of the present invention, the terminal device # A may send the related information of the terminal device # A to the network device through the common air interface.

It should be understood that, the method for obtaining, by the network device, the related information of the terminal device # A listed above is merely for illustration purposes, and the present invention is not limited thereto. For example, the network device may alternatively obtain the related information of the terminal device # A from a network operator or a higher layer management device.

Subsequently, the network device may send configuration information of the target dedicated air interface for the terminal device # A (or an index of configuration information of the target dedicated air interface) and a transmission resource used by the target dedicated air interface to the terminal device # A through the common air interface, for example, a broadcast channel (that is, the public primary broadcast channel or the public secondary broadcast channel) of the common air interface.

It should be noted that, in this embodiment of the present invention, the transmission resource may include at least one of a time domain resource, a frequency domain resource, a code domain resource, a space domain resource, or a pilot resource. This is not particularly limited in the present invention. For example, the transmission resource used by the target dedicated air interface may be a time-frequency resource allocated in the manner shown in FIG. 4 to FIG. 6.

Therefore, the terminal device # A can learn the target dedicated air interface allocated by the network device to the terminal device # A, and the transmission resource used by the target dedicated air interface, so as to perform communication based on the target dedicated air interface.

Manner 2

Optionally, the receiving, by the terminal device according to the common air interface, configuration information of a target dedicated air interface and indication information of a target transmission resource that are sent by the network device includes:

receiving, by the terminal device according to the common air interface, configuration information of the at least one dedicated air interface that is sent by the network device; and the method further includes:

determining, by the terminal device, the target dedicated air interface in the at least one dedicated air interface according to related information of the terminal device, where the related information of the terminal device includes at least one of a service type of a service accessed by the terminal device, mobility of the terminal device, or a transmission rate requirement of the terminal device.

Specifically, in this embodiment of the present invention, the network device can deliver configuration information of multiple dedicated air interfaces and transmission resources respectively used by the multiple dedicated air interfaces to the terminal device # A through the common air interface, so that the terminal device # A can select, based on the related information of the terminal device # A, from the multiple dedicated air interfaces, an air interface corresponding to the related information of the terminal device # A as the target dedicated air interface, and perform wireless communication with the network device by using the target dedicated air interface and the transmission resource used by the target dedicated air interface.

It should be noted that, in this embodiment of the present invention, a process in which the terminal device # A determines the target dedicated air interface in the multiple dedicated air interfaces based on the related information of the terminal device # A may be similar to a process in which the network device determines the target dedicated air interface in the multiple dedicated air interfaces based on the related information of the terminal device # A in the manner 1. Herein, to avoid repeated descriptions, detailed descriptions are omitted.

In this embodiment of the present invention, a method and a process for performing communication by the network device and the terminal device # A based on the target dedicated air interface and the transmission resource used by the target dedicated air interface may be similar to a method and a process for performing wireless communication by a network device and a terminal device based on a given air interface and resource in the prior art. Herein, to avoid repeated descriptions, detailed descriptions are omitted.

In addition, in this embodiment of the present invention, the network device and the terminal device # A may further help wireless communication in a dedicated air interface by using the common air interface.

Optionally, the method further includes:

receiving, by the terminal device through the common air interface, broadcast information corresponding to the target dedicated air interface and sent by the network device.

Specifically, in this embodiment of the present invention, broadcast information of each dedicated air interface (including the target dedicated air interface) may be transmitted through the common air interface (for example, the public primary broadcast channel or the public secondary broadcast channel of the common air interface).

Optionally, the method further includes:

receiving, by the terminal device through the target dedicated air interface, broadcast information corresponding to the target dedicated air interface and sent by the network device.

Specifically, in this embodiment of the present invention, a broadcast channel may be configured for each dedicated air interface (including the target dedicated air interface) (a specific method and process may be similar to those in the prior art, and herein, to avoid repeated descriptions, detailed descriptions are omitted), and broadcast information of the dedicated air interface may be transmitted through the broadcast channel.

Optionally, the method further includes:

receiving, by the terminal device through the common air interface, public broadcast information sent by the network device, where the public broadcast information is same information in broadcast information corresponding to each dedicated air interface, and receiving, through the target dedicated air interface, information other than the public broadcast information in broadcast information corresponding to the target dedicated air interface and sent by the network device.

Specifically, same broadcast information of each dedicated air interface, for example, a cell identifier, a public measurement reference signal configuration, a public random access channel configuration, a public paging channel, or a same neighboring cell configuration may be transmitted through the common air interface (for example, the public primary broadcast channel or the public secondary broadcast channel of the common air interface), and different broadcast information of the dedicated air interfaces, for example, different channels, reference signals, or neighboring cell configurations may be respectively transmitted through broadcast channels located on time-frequency resources used by the dedicated air interfaces.

Optionally, the method further includes:

receiving, by the terminal device through the common air interface, a synchronization signal corresponding to the target dedicated air interface and sent by the network device.

Specifically, in this embodiment of the present invention, for example, before data is transmitted through each dedicated air interface (or, when data is transmitted), synchronization processing needs to be performed on each professional air interface. In this case, a synchronization signal used for each dedicated air interface (including the target dedicated air interface) on which synchronization processing is performed may be transmitted through the common air interface (for example, the synchronization channel of the common air interface).

In this case, the sending period of the synchronization channel of the common air interface should meet requirements of all air interfaces that are synchronized with the common air interface. For example, in the ultra short delay service, to satisfy a relatively short subframe, perform synchronization as soon as possible, and determine a requirement for a subframe border, a sending period of a synchronization channel is configured as 0.25 ms, and a requirement of the wireless broadband service can be met as long as a period of a synchronization channel is 10 ms in the wireless broadband service, that is, a sending period requirement of a synchronization channel of each air interface should be in an integer multiple relationship with a minimum period. For example, when the network device supports both two services, if the base station sends a synchronization signal every 0.25 ms, a terminal of the ultra short delay service receives one synchronization signal every 0.25 ms, and because 10 ms is in an integer multiple relationship with 0.25 ms, for a common broadband service, one synchronization signal can also be received every 10 ms.

Optionally, the synchronization signal corresponding to the target dedicated air interface and a synchronization signal corresponding to the common air interface are a same signal.

Optionally, for this application, the same signal may use different transmission formats, for example, use transmission control parameters corresponding to different numerology. Similarly, a "same signal" involved in other related places in this application is not described in detail below again.

Optionally, the method further includes:

receiving, by the terminal device through the common air interface, a measurement signal corresponding to the target dedicated air interface and sent by the network device.

Specifically, in this embodiment of the present invention, for example, before data is transmitted through each dedicated air interface (or, when data is being transmitted), measurement processing needs to be performed on each professional air interface. In this case, a measurement signal (or referred to as a reference signal) used for each dedicated air interface (including the target dedicated air interface) on which measurement processing is performed may be transmitted through the common air interface (for example, a reference channel of the common air interface).

Optionally, the measurement signal corresponding to the target dedicated air interface and a measurement signal corresponding to the common air interface are a same signal.

Optionally, the method further includes:

receiving, by the terminal device through the common air interface, a paging signal corresponding to the target dedicated air interface and sent by the network device.

Specifically, in this embodiment of the present invention, a paging signal of each dedicated air interface (including the target dedicated air interface) may be transmitted through the common air interface.

Optionally, the paging signal corresponding to the target dedicated air interface and a paging signal corresponding to the common air interface are carried on a same channel.

Optionally, the method further includes:

receiving, by the terminal device according to the target dedicated air interface, a synchronization signal corresponding to the target dedicated air interface and sent by the network device.

Specifically, in this embodiment of the present invention, a synchronization channel may be configured for each dedicated air interface (including the target dedicated air interface) (a specific method and process may be similar to those in the prior art, and herein, to avoid repeated descriptions, detailed descriptions are omitted), and a synchronization signal of the dedicated air interface may be transmitted through the synchronization channel.

Optionally, the method further includes:

receiving, by the terminal device according to the target dedicated air interface, a measurement signal corresponding to the target dedicated air interface and sent by the network device.

Specifically, in this embodiment of the present invention, a reference channel may be configured for each dedicated air interface (including the target dedicated air interface) (a specific method and process may be similar to those in the prior art, and herein, to avoid repeated descriptions, detailed descriptions are omitted), and a reference signal (that is, a measurement signal) of the dedicated air interface may be transmitted through the broadcast channel.

Optionally, the method further includes:

receiving, by the terminal device according to the target dedicated air interface, a paging signal corresponding to the target dedicated air interface and sent by the network device.

Specifically, in this embodiment of the present invention, for example, before data is transmitted through each dedicated air interface, paging processing needs to be performed on each professional air interface. In this case, a paging channel used for paging processing may be configured for each dedicated air interface (including the target dedicated air interface) (a specific method and process may be similar to those in the prior art, and herein, to avoid repeated descriptions, detailed descriptions are omitted), and a paging signal of the dedicated air interface may be transmitted through the broadcast channel.

In addition, in this embodiment of the present invention, an identifier may be further allocated to each air interface, to distinguish between paging signals corresponding to different air interfaces. The terminal device may receive paging in the common air interface, or obtain, according to an indication, paging on a time-frequency resource corresponding to an air interface to which the terminal device pays attention, and a configuration of a paging channel of the air interface may be sent through a public broadcast channel.

Optionally, the method further includes:

performing, by the terminal device by using a same channel, access processing corresponding to the target dedicated air interface and access processing corresponding to the common air interface.

Specifically, in this embodiment of the present invention, for example, when the common air interface and the target dedicated air interface correspond to a same logical cell (for example, network devices providing the common air interface and the target dedicated air interface are a same device), by using the common air interface, access processing may be performed on a cell corresponding to the target dedicated air interface, and access processing may be performed on a cell corresponding to the common air interface.

Optionally, the method further includes:

performing, by the network device by using different channels, access processing corresponding to the target dedicated air interface and access processing corresponding to the common air interface.

Specifically, in this embodiment of the present invention, for example, when the common air interface and the target dedicated air interface correspond to different logical cells (for example, network devices providing the common air interface and the target dedicated air interface are different devices), access processing may be performed, by using the common air interface, on a cell corresponding to the common air interface, and access processing may be performed, by using the dedicated air interface, on a cell corresponding to the dedicated air interface.

Herein, "access processing" may refer to a processing process (for example, a random access process or an access management process) in which the terminal device attempts to access the network device and establishes a connection to the network device, and a specific process of the access processing may be similar to that in the prior art. For example, information transmitted in the access processing may be similar to that in the prior art. Herein, to avoid repeated descriptions, detailed descriptions are omitted.

It should be noted that, the receiving, by the terminal device, configuration information of a target dedicated air interface and indication information of a target transmission resource from the network device through the common air interface may include:

receiving, by the terminal device through the common air interface, the configuration information of the target dedicated air interface and the indication information of the target transmission resource that are directly sent by the network device; or receiving, by the terminal device through the common air interface, the configuration information of the target dedicated air interface and the indication information of the target transmission resource that are indirectly sent by the network device through another network element.

According to the wireless communication method in this embodiment of the present invention, the terminal device and the network device determine through negotiation, through a specified common air interface, in at least one dedicated air interface, a target dedicated air interface and a transmission resource used by the target dedicated air interface, and perform wireless communication by using the target professional air interface, so that multiple air interfaces can share one communication system, and a communication system does not need to be separately configured for a dedicated air interface, thereby reducing costs and meeting a personalized requirement for an air interface in time.

FIG. 14 is a schematic flowchart of a wireless communication method 300 according to an embodiment of the present invention, which is described from the perspective of a network device. As shown in FIG. 14, the method 300 is performed in a communication system using at least two air interfaces, configuration information of the at least two air interfaces is different, the at least two air interfaces include a common air interface and at least one dedicated air interface, configuration information of the common air interface is preconfigured in a network device and a terminal device, and the method 300 includes the following steps:

S310: The network device sends configuration information of a target dedicated air interface and indication information of a target transmission resource to the terminal device through the common air interface, where the target transmission resource is a transmission resource used by the target dedicated air interface.

S320: The network device performs wireless communication with the terminal device through the target dedicated air interface and the target transmission resource.

Optionally, the configuration information includes at least one of a waveform parameter, a modulation scheme, a multiple access method, a bandwidth configuration, a radio frame configuration method, a resource multiplexing mode, a user scheduling mode, a channel configuration method, a coding scheme, or a protocol stack configuration method.

Optionally, the method further includes:

obtaining, by the network device, related information of the terminal device, where the related information of the terminal device includes at least one of a service type of a service accessed by the terminal device, mobility of the terminal device, or a transmission rate requirement of the terminal device; and determining, by the network device, the target dedicated air interface in the at least one dedicated air interface according to the related information of the terminal device.

Optionally, the sending, by the network device, configuration information of a target dedicated air interface and indication information of a target transmission resource to the terminal device through the common air interface includes:

sending, by the network device, configuration information of the at least one dedicated air interface to the terminal device through the common air interface, so that the terminal device determines the target dedicated air interface in the at least one dedicated air interface according to related information of the terminal device, where the related information of the terminal device includes at least one of a service type of a service accessed by the terminal device, mobility of the terminal device, or a transmission rate requirement of the terminal device.

Optionally, the method further includes:

sending, by the network device, broadcast information corresponding to the target dedicated air interface to the network device through the common air interface; or sending, by the network device, broadcast information corresponding to the target dedicated air interface to the network device through the target dedicated air interface; or sending, by the network device, public broadcast information to the terminal device through the common air interface, where the public broadcast information is same information in broadcast information corresponding to each dedicated air interface, and sending information other than the public broadcast information in broadcast information corresponding to the target dedicated air interface to the terminal device through the target dedicated air interface.

Optionally, the method further includes:

sending, by the network device, a synchronization signal corresponding to the target dedicated air interface to the terminal device through the common air interface, where the synchronization signal corresponding to the target dedicated air interface and a synchronization signal corresponding to the common air interface are a same signal; or sending, by the network device, a measurement signal corresponding to the target dedicated air interface to the terminal device through the common air interface, where the measurement signal corresponding to the target dedicated air interface and a measurement signal corresponding to the common air interface are a same signal; or sending, by the network device, a paging signal corresponding to the target dedicated air interface to the terminal device through the common air interface, where the paging signal corresponding to the target dedicated air interface and a paging signal corresponding to the common air interface are carried on a same channel.

Optionally, the method further includes:

sending, by the network device, a synchronization signal corresponding to the target dedicated air interface to the terminal device through the target dedicated air interface; or sending, by the network device, a measurement signal corresponding to the target dedicated air interface to the terminal device through the target dedicated air interface; or sending, by the network device, a paging signal corresponding to the target dedicated air interface to the terminal device through the target dedicated air interface.

Optionally, the method further includes:

performing, by the network device by using a same channel, access processing corresponding to the target dedicated air interface and access processing corresponding to the common air interface; or performing, by the network device by using different channels, access processing corresponding to the target dedicated air interface and access processing corresponding to the common air interface.

Optionally, the network device includes a macro station and a micro station, the macro station performs wireless communication by using the common air interface, and the micro station performs wireless communication by using the dedicated air interface.

Optionally, the communication system includes multiple micro stations, each micro station performs wireless communication by using the common air interface, and the network device is a micro station whose coverage covers a location of the terminal device.

Optionally, the obtaining, by the network device, related information of the terminal device includes:

receiving, by the network device through the common air interface, the related information of the terminal device sent by the terminal device.

An action of the terminal device in the method 300 is similar to an action of the terminal device in the method 200, and an action of the network device in the method 300 is similar to an action of the network device in the method 200. Herein, to avoid repeated descriptions, detailed descriptions are omitted.

According to the wireless communication method in this embodiment of the present invention, the terminal device and the network device determine through negotiation, through a specified common air interface, in at least one dedicated air interface, a target dedicated air interface and a transmission resource used by the target dedicated air interface, and perform wireless communication by using the target professional air interface, so that multiple air interfaces can share one communication system, and a communication system does not need to be separately configured for a dedicated air interface, thereby reducing costs and meeting a personalized requirement for an air interface in time.

The wireless communication methods according to the embodiments of the present invention are described in detail above with reference to FIG. 1 to FIG. 14, and wireless communication apparatuses according to embodiments of the present invention are described in detail below with reference to FIG. 15 and FIG. 16.

FIG. 15 is a schematic block diagram of a wireless communication apparatus 400 according to an embodiment of the present invention. The apparatus 400 is configured in a communication system using at least two air interfaces, configuration information of the at least two air interfaces is different, the at least two air interfaces include a common air interface and at least one dedicated air interface, configuration information of the common air interface is preconfigured in a network device and the apparatus, and as shown in FIG. 15, the apparatus 400 includes:

a receiving unit, configured to receive configuration information of a target dedicated air interface and indication information of a target transmission resource from the network device through the common air interface, where the target transmission resource is a transmission resource used by the target dedicated air interface; and a communication unit, configured to perform wireless communication with the network device by using the target dedicated air interface and the target transmission resource.

Optionally, the configuration information includes at least one of a waveform parameter, a modulation scheme, a multiple access method, a bandwidth configuration, a radio frame configuration method, a resource multiplexing mode, a user scheduling mode, a channel configuration method, a coding scheme, or a protocol stack configuration method.

Optionally, the target dedicated air interface is determined by the network device in the at least one dedicated air interface according to related information of the apparatus, and the related information of the apparatus includes at least one of a service type of a service accessed by the apparatus, mobility of the apparatus, or a transmission rate requirement of the apparatus.

Optionally, the receiving unit is specifically configured to receive, according to the common air interface, configuration information of the at least one dedicated air interface that is sent by the network device; and the apparatus further includes:

a determining unit, configured to determine the target dedicated air interface in the at least one dedicated air interface according to related information of the apparatus, where the related information of the apparatus includes at least one of a service type of a service accessed by the apparatus, mobility of the apparatus, or a transmission rate requirement of the apparatus.

Optionally, the receiving unit is further configured to receive, through the common air interface, broadcast information corresponding to the target dedicated air interface and sent by the network device; or the receiving unit is further configured to receive, through the target dedicated air interface, broadcast information corresponding to the target dedicated air interface and sent by the network device; or the receiving unit is further configured to receive, through the common air interface, public broadcast information sent by the network device, where the public broadcast information is same information in broadcast information corresponding to each dedicated air interface, and receive, through the target dedicated air interface, information other than the public broadcast information in broadcast information corresponding to the target dedicated air interface and sent by the network device.

Optionally, the receiving unit is further configured to receive, by the apparatus through the common air interface, a synchronization signal corresponding to the target dedicated air interface and sent by the network device, where the synchronization signal corresponding to the target dedicated air interface and a synchronization signal corresponding to the common air interface are a same signal; or the receiving unit is further configured to receive, through the common air interface, a measurement signal corresponding to the target dedicated air interface and sent by the network device, where the measurement signal corresponding to the target dedicated air interface and a measurement signal corresponding to the common air interface are a same signal; or the receiving unit is further configured to receive, through the common air interface, a paging signal corresponding to the target dedicated air interface and sent by the network device, where the paging signal corresponding to the target dedicated air interface and a paging signal corresponding to the common air interface are carried on a same channel.

Optionally, the receiving unit is further configured to receive, according to the target dedicated air interface, a synchronization signal corresponding to the target dedicated air interface and sent by the network device; or the receiving unit is further configured to receive, according to the target dedicated air interface, a measurement signal corresponding to the target dedicated air interface and sent by the network device; or the receiving unit is further configured to receive, according to the target dedicated air interface, a paging signal corresponding to the target dedicated air interface and sent by the network device.

Optionally, the communication unit is further configured to perform, by the apparatus by using a same channel, access processing corresponding to the target dedicated air interface and access processing corresponding to the common air interface; or the communication unit is further configured to perform, by using different channels, access processing corresponding to the target dedicated air interface and access processing corresponding to the common air interface.

Optionally, the network device includes a macro station and a micro station, the macro station performs wireless communication by using the common air interface, and the micro station performs wireless communication by using the dedicated air interface.

Optionally, the communication system includes multiple micro stations, each micro station performs wireless communication by using the common air interface, and the network device is a micro station whose coverage covers a location of the apparatus.

The wireless communication apparatus 400 according to this embodiment of the present invention may correspond to the terminal device in the method in the embodiments of the present invention, and the foregoing and other operations and/or functions of units, that is, modules in the wireless communication apparatus 400 are respectively for implementing corresponding procedures in the method 200 in FIG. 3. For brevity, details are not described herein again.

According to the wireless communication apparatus in this embodiment of the present invention, the terminal device and the network device determine through negotiation, through a specified common air interface, in at least one dedicated air interface, a target dedicated air interface and a transmission resource used by the target dedicated air interface, and perform wireless communication by using the target professional air interface, so that multiple air interfaces can share one communication system, and a communication system does not need to be separately configured for a dedicated air interface, thereby reducing costs and meeting a personalized requirement for an air interface in time.

FIG. 16 is a schematic block diagram of a wireless communication apparatus 500 according to an embodiment of the present invention. The apparatus 500 is configured in a communication system using at least two air interfaces, configuration information of the at least two air interfaces is different, the at least two air interfaces include a common air interface and at least one dedicated air interface, configuration information of the common air interface is preconfigured in the apparatus and a terminal device, and as shown in FIG. 16, the apparatus 500 includes:

a sending unit 510, configured to send configuration information of a target dedicated air interface and indication information of a target transmission resource to the terminal device through the common air interface, where the target transmission resource is a transmission resource used by the target dedicated air interface; and a communication unit 520, configured to perform wireless communication with the terminal device by using the target dedicated air interface and the target transmission resource.

Optionally, the configuration information includes at least one of a waveform parameter, a modulation scheme, a multiple access method, a bandwidth configuration, a radio frame configuration method, a resource multiplexing mode, a user scheduling mode, a channel configuration method, a coding scheme, or a protocol stack configuration method.

Optionally, the apparatus further includes:

an obtaining unit, configured to obtain related information of the terminal device, where the related information of the terminal device includes at least one of a service type of a service accessed by the terminal device, mobility of the terminal device, or a transmission rate requirement of the terminal device; and a determining unit, configured to determine the target dedicated air interface in the at least one dedicated air interface according to the related information of the terminal device.

Optionally, the sending unit is specifically configured to send configuration information of the at least one dedicated air interface to the terminal device through the common air interface, so that the terminal device determines the target dedicated air interface in the at least one dedicated air interface according to related information of the terminal device, where the related information of the terminal device includes at least one of a service type of a service accessed by the terminal device, mobility of the terminal device, or a transmission rate requirement of the terminal device.

Optionally, the sending unit is further configured to send broadcast information corresponding to the target dedicated air interface to the apparatus through the common air interface; or the sending unit is further configured to send broadcast information corresponding to the target dedicated air interface to the apparatus through the target dedicated air interface; or the sending unit is further configured to: send public broadcast information to the terminal device through the common air interface, where the public broadcast information is same information in broadcast information corresponding to each dedicated air interface, and send information other than the public broadcast information in broadcast information corresponding to the target dedicated air interface to the terminal device through the target dedicated air interface.

Optionally, the sending unit is further configured to send a synchronization signal corresponding to the target dedicated air interface to the terminal device through the common air interface, where the synchronization signal corresponding to the target dedicated air interface and a synchronization signal corresponding to the common air interface are a same signal; or the sending unit is further configured to send a measurement signal corresponding to the target dedicated air interface to the terminal device through the common air interface, where the measurement signal corresponding to the target dedicated air interface and a measurement signal corresponding to the common air interface are a same signal; or the sending unit is further configured to send a paging signal corresponding to the target dedicated air interface to the terminal device through the common air interface, where the paging signal corresponding to the target dedicated air interface and a paging signal corresponding to the common air interface are carried on a same channel.

Optionally, the sending unit is further configured to send a synchronization signal corresponding to the target dedicated air interface to the terminal device through the target dedicated air interface; or the sending unit is further configured to send a measurement signal corresponding to the target dedicated air interface to the terminal device through the target dedicated air interface; or the sending unit is further configured to send a paging signal corresponding to the target dedicated air interface to the terminal device through the target dedicated air interface.

Optionally, the communication unit is further configured to perform, by using a same channel, access processing corresponding to the target dedicated air interface and access processing corresponding to the common air interface; or the communication unit is further configured to perform, by using different channels, access processing corresponding to the target dedicated air interface and access processing corresponding to the common air interface.

Optionally, the apparatus includes a macro station and a micro station, the macro station performs wireless communication by using the common air interface, and the micro station performs wireless communication by using the dedicated air interface.

Optionally, the communication system includes multiple micro stations, each micro station performs wireless communication by using the common air interface, and the apparatus is a micro station whose coverage covers a location of the terminal device.

The wireless communication apparatus 500 according to this embodiment of the present invention may correspond to the network device in the method in the embodiments of the present invention, and the foregoing and other operations and/or functions of units, that is, modules in the wireless communication apparatus 500 are respectively for implementing corresponding procedures in the method 300 in FIG. 14. For brevity, details are not described herein again.

According to the wireless communication apparatus in this embodiment of the present invention, the terminal device and the network device determine through negotiation, through a specified common air interface, in at least one dedicated air interface, a target dedicated air interface and a transmission resource used by the target dedicated air interface, and perform wireless communication by using the target professional air interface, so that multiple air interfaces can share one communication system, and a communication system does not need to be separately configured for a dedicated air interface, thereby reducing costs and meeting a personalized requirement for an air interface in time.

The wireless communication methods according to the embodiments of the present invention are described in detail above with reference to FIG. 1 to FIG. 14, and wireless communication devices according to embodiments of the present invention are described in detail below with reference to FIG. 17 and FIG. 18.

Figure 17:
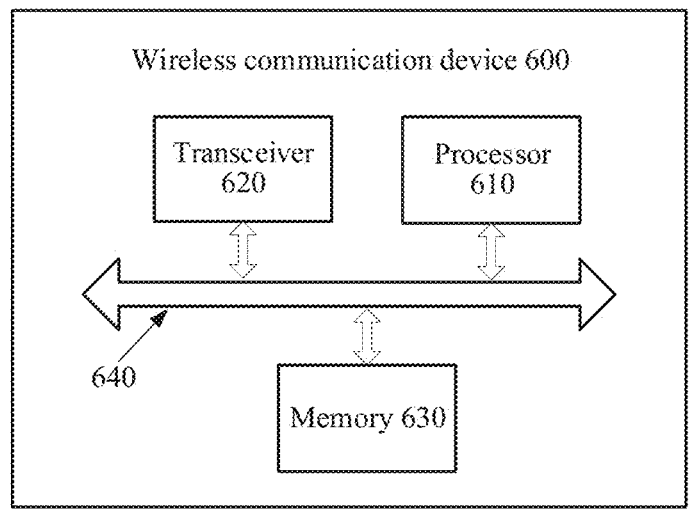
FIG. 17 is a schematic structural diagram of a wireless communication device according to an embodiment of the present invention.

FIG. 17 is a schematic block diagram of a wireless communication device 600 according to an embodiment of the present invention. The device 600 is configured in a communication system using at least two air interfaces for execution, configuration information of the at least two air interfaces is different, the at least two air interfaces include a common air interface and at least one dedicated air interface, configuration information of the common air interface is preconfigured in a network device and the device 600, and as shown in FIG. 17, the device 600 includes: a processor 610 and a transceiver 620. The processor 610 is connected to the transceiver 620. Optionally, the device 600 further includes a memory 630. The memory 630 is connected to the processor 610. Further, optionally, the device 600 includes a bus system 640. The processor 610, the memory 630, and the transceiver 620 may be connected by using the bus system 640. The memory 630 may be configured to store an instruction. The processor 610 is configured to execute the instruction stored in the memory 630, to control the transceiver 620 to receive information or a signal.

The processor 610 is configured to control the transceiver 620 to receive configuration information of a target dedicated air interface and indication information of a target transmission resource from the network device through the common air interface, where the target transmission resource is a transmission resource used by the target dedicated air interface; and configured to control the transceiver 620 to perform wireless communication with the network device by using the target dedicated air interface and the target transmission resource.

Optionally, the configuration information includes at least one of a waveform parameter, a modulation scheme, a multiple access method, a bandwidth configuration, a radio frame configuration method, a resource multiplexing mode, a user scheduling mode, a channel configuration method, a coding scheme, or a protocol stack configuration method.

Optionally, the target dedicated air interface is determined by the network device in the at least one dedicated air interface according to related information of the device 600, and the related information of the device 600 includes at least one of a service type of a service accessed by the device 600, mobility of the device 600, or a transmission rate requirement of the device 600.

Optionally, the processor 610 is specifically configured to control the transceiver 620 to receive, according to the common air interface, configuration information of the at least one dedicated air interface that is sent by the network device; and configured to determine the target dedicated air interface in the at least one dedicated air interface according to related information of the device 600, where the related information of the device 600 includes at least one of a service type of a service accessed by the device 600, mobility of the device 600, or a transmission rate requirement of the device 600.

Optionally, the processor 610 is further configured to control the transceiver 620 to receive, through the common air interface, broadcast information corresponding to the target dedicated air interface and sent by the network device; or the processor 610 is further configured to control the transceiver 620 to receive, through the target dedicated air interface, broadcast information corresponding to the target dedicated air interface and sent by the network device; or the processor 610 is further configured to control the transceiver 620 to receive, through the common air interface, public broadcast information sent by the network device, where the public broadcast information is same information in broadcast information corresponding to each dedicated air interface, and receive, through the target dedicated air interface, information other than the public broadcast information in broadcast information corresponding to the target dedicated air interface and sent by the network device.

Optionally, the processor 610 is further configured to control the transceiver 620 to receive, through the common air interface, a synchronization signal corresponding to the target dedicated air interface and sent by the network device, where the synchronization signal corresponding to the target dedicated air interface and a synchronization signal corresponding to the common air interface are a same signal; or the processor 610 is further configured to control the transceiver 620 to receive, through the common air interface, a measurement signal corresponding to the target dedicated air interface and sent by the network device, where the measurement signal corresponding to the target dedicated air interface and a measurement signal corresponding to the common air interface are a same signal; or the processor 610 is further configured to control the transceiver 620 to receive, through the common air interface, a paging signal corresponding to the target dedicated air interface and sent by the network device, where the paging signal corresponding to the target dedicated air interface and a paging signal corresponding to the common air interface are carried on a same channel.

Optionally, the processor 610 is further configured to control the transceiver 620 to receive, according to the target dedicated air interface, a synchronization signal corresponding to the target dedicated air interface and sent by the network device; or the processor 610 is further configured to control the transceiver 620 to receive, according to the target dedicated air interface, a measurement signal corresponding to the target dedicated air interface and sent by the network device; or the processor 610 is further configured to control the transceiver 620 to receive, according to the target dedicated air interface, a paging signal corresponding to the target dedicated air interface and sent by the network device.

Optionally, the processor 610 is further configured to control the transceiver 620 to perform, by using a same channel, access processing corresponding to the target dedicated air interface and access processing corresponding to the common air interface; or the processor 610 is further configured to control the transceiver 620 to perform, by using different channels, access processing corresponding to the target dedicated air interface and access processing corresponding to the common air interface.

Optionally, the network device includes a macro station and a micro station, the macro station performs wireless communication by using the common air interface, and the micro station performs wireless communication by using the dedicated air interface.

Optionally, the communication system includes multiple micro stations, each micro station performs wireless communication by using the common air interface, and the network device is a micro station whose coverage covers a location of the device 600.

It should be understood that, in this embodiment of the present invention, the processor 610 may be a central processing unit (Central Processing Unit, "CPU" for short), and the processor 610 may alternatively be another general purpose processor, a digital signal processor (DSP), an application-specific integrated circuit (ASIC), a field programmable gate array (FPGA), another programmable logic device, a discrete gate, a transistor logic device, a discrete hardware component, or the like. The general purpose processor may be a microprocessor or the processor may be any normal processor, or the like.

The memory 630 may include a read-only memory and a random access memory, and provide an instruction and data to the processor 610. A part of the memory 630 may further include a non-volatile random access memory. For example, the memory 630 may further store device type information.

The bus system 640 may further include a power bus, a control bus, a status signal bus, and the like, in addition to a data bus. However, for clear description, various types of buses in the figure are marked as the bus system 640.

In an implementation process, steps in the foregoing methods may be completed by using an integrated logical circuit of hardware in the processor 610 or instructions in a form of software in the processor 610. The steps in the methods disclosed with reference to the embodiments of the present invention may be directly performed and completed by a hardware processor, or may be performed and completed by using a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory 630, and the processor 610 reads information in the memory 630 and completes the steps in the foregoing methods in combination with hardware of the processor 610. To avoid repetition, details are not described herein again.

The wireless communication device 600 according to this embodiment of the present invention may correspond to the terminal device in the method in the embodiments of the present invention, and the foregoing and other operations and/or functions of units, that is, modules in the wireless communication device 600 are respectively for implementing corresponding procedures in the method 200 in FIG. 3. For brevity, details are not described herein again.

According to the wireless communication device in this embodiment of the present invention, the terminal device and the network device determine through negotiation, through a specified common air interface, in at least one dedicated air interface, a target dedicated air interface and a transmission resource used by the target dedicated air interface, and perform wireless communication by using the target professional air interface, so that multiple air interfaces can share one communication system, and a communication system does not need to be separately configured for a dedicated air interface, thereby reducing costs and meeting a personalized requirement for an air interface in time.

Figure 18:
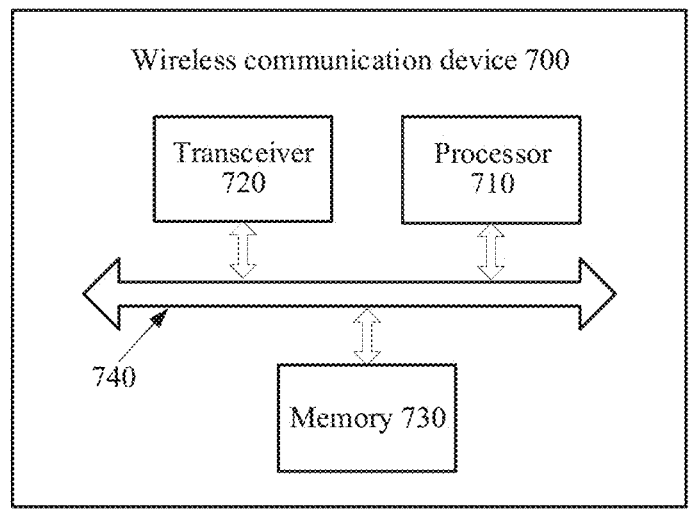
FIG. 18 is a schematic structural diagram of a wireless communication device according to another embodiment of the present invention.

FIG. 18 is a schematic block diagram of a wireless communication device 700 according to an embodiment of the present invention. The device 700 is configured in a communication system using at least two air interfaces, configuration information of the at least two air interfaces is different, the at least two air interfaces include a common air interface and at least one dedicated air interface, configuration information of the common air interface is preconfigured in the device 700 and a terminal device 18, and as shown in FIG. 18, the device 700 includes: a processor 710 and a transceiver 720. The processor 710 is connected to the transceiver 720. Optionally, the device 700 further includes a memory 730. The memory 730 is connected to the processor 710. Further, optionally, the device 700 includes a bus system 740. The processor 710, the memory 730, and the transmitter 720 may be connected by using the bus system 740. The memory 730 may be configured to store an instruction. The processor 710 is configured to execute the instruction stored in the memory 730, to control the transceiver 720 to receive information or a signal.

The processor 710 is configured to control the transceiver 720 to send configuration information of a target dedicated air interface and indication information of a target transmission resource to the terminal device through the common air interface, where the target transmission resource is a transmission resource used by the target dedicated air interface; and configured to control the transceiver 720 to perform wireless communication with the terminal device by using the target dedicated air interface and the target transmission resource.

Optionally, the configuration information includes at least one of a waveform parameter, a modulation scheme, a multiple access method, a bandwidth configuration, a radio frame configuration method, a resource multiplexing mode, a user scheduling mode, a channel configuration method, a coding scheme, or a protocol stack configuration method.

Optionally, the processor 710 is further configured to obtain related information of the terminal device, where the related information of the terminal device includes at least one of a service type of a service accessed by the terminal device, mobility of the terminal device, or a transmission rate requirement of the terminal device; and configured to determine the target dedicated air interface in the at least one dedicated air interface according to the related information of the terminal device.

Optionally, the processor 710 is further configured to control the transceiver 720 to send configuration information of the at least one dedicated air interface to the terminal device through the common air interface, so that the terminal device determines the target dedicated air interface in the at least one dedicated air interface according to related information of the terminal device, where the related information of the terminal device includes at least one of a service type of a service accessed by the terminal device, mobility of the terminal device, or a transmission rate requirement of the terminal device.

Optionally, the processor 710 is further configured to control the transceiver 720 to send broadcast information corresponding to the target dedicated air interface to the device 700 through the common air interface; or the processor 710 is further configured to control the transceiver 720 to send broadcast information corresponding to the target dedicated air interface to the device 700 through the target dedicated air interface; or the processor 710 is further configured to control the transceiver 720 to: send public broadcast information to the terminal device through the common air interface, where the public broadcast information is same information in broadcast information corresponding to each dedicated air interface, and send information other than the public broadcast information in broadcast information corresponding to the target dedicated air interface to the terminal device through the target dedicated air interface.

Optionally, the processor 710 is further configured to control the transceiver 720 to send a synchronization signal corresponding to the target dedicated air interface to the terminal device through the common air interface, where the synchronization signal corresponding to the target dedicated air interface and a synchronization signal corresponding to the common air interface are a same signal; or the processor 710 is further configured to control the transceiver 720 to send a measurement signal corresponding to the target dedicated air interface to the terminal device through the common air interface, where the measurement signal corresponding to the target dedicated air interface and a measurement signal corresponding to the common air interface are a same signal; or the processor 710 is further configured to control the transceiver 720 to send a paging signal corresponding to the target dedicated air interface to the terminal device through the common air interface, where the paging signal corresponding to the target dedicated air interface and a paging signal corresponding to the common air interface are carried on a same channel.

Optionally, the processor 710 is further configured to control the transceiver 720 to send a synchronization signal corresponding to the target dedicated air interface to the terminal device through the target dedicated air interface; or the processor 710 is further configured to control the transceiver 720 to send a measurement signal corresponding to the target dedicated air interface to the terminal device through the target dedicated air interface; or the processor 710 is further configured to control the transceiver 720 to send a paging signal corresponding to the target dedicated air interface to the terminal device through the target dedicated air interface.

Optionally, the processor 710 is further configured to control the transceiver 720 to perform, by using a same channel, access processing corresponding to the target dedicated air interface and access processing corresponding to the common air interface; or the processor 710 is further configured to control the transceiver 720 to perform, by using different channels, access processing corresponding to the target dedicated air interface and access processing corresponding to the common air interface.

Optionally, the device 700 includes a macro station and a micro station, the macro station performs wireless communication by using the common air interface, and the micro station performs wireless communication by using the dedicated air interface.

Optionally, the communication system includes multiple micro stations, each micro station performs wireless communication by using the common air interface, and the device 700 is a micro station whose coverage covers a location of the terminal device.

It should be understood that, in this embodiment of the present invention, the processor 710 may be a central processing unit (Central Processing Unit, "CPU" for short), and the processor 710 may alternatively be another general purpose processor, a digital signal processor (DSP), an application-specific integrated circuit (ASIC), a field programmable gate array (FPGA), another programmable logic device, a discrete gate, a transistor logic device, a discrete hardware component, or the like. The general purpose processor may be a microprocessor or the processor may be any normal processor, or the like.

The memory 730 may include a read-only memory and a random access memory, and provide an instruction and data to the processor 710. A part of the memory 730 may further include a non-volatile random access memory. For example, the memory 730 may further store device type information.

The bus system 740 may further include a power bus, a control bus, a status signal bus, and the like, in addition to a data bus. However, for clear description, various types of buses in the figure are marked as the bus system 740.

In an implementation process, steps in the foregoing methods may be completed by using an integrated logical circuit of hardware in the processor 710 or instructions in a form of software in the processor 710. The steps in the methods disclosed with reference to the embodiments of the present invention may be directly performed and completed by a hardware processor, or may be performed and completed by using a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory 730, and the processor 710 reads information in the memory 730 and completes the steps in the foregoing methods in combination with hardware of the processor 710. To avoid repetition, details are not described herein again.

The wireless communication device 700 according to this embodiment of the present invention may correspond to the network device in the method in the embodiments of the present invention, and the foregoing and other operations and/or functions of units, that is, modules in the wireless communication device 700 are respectively for implementing corresponding procedures in the method 300 in FIG. 14. For brevity, details are not described herein again.

According to the wireless communication device in this embodiment of the present invention, the terminal device and the network device determine through negotiation, through a specified common air interface, in at least one dedicated air interface, a target dedicated air interface and a transmission resource used by the target dedicated air interface, and perform wireless communication by using the target professional air interface, so that multiple air interfaces can share one communication system, and a communication system does not need to be separately configured for a dedicated air interface, thereby reducing costs and meeting a personalized requirement for an air interface in time.

Figure 19:
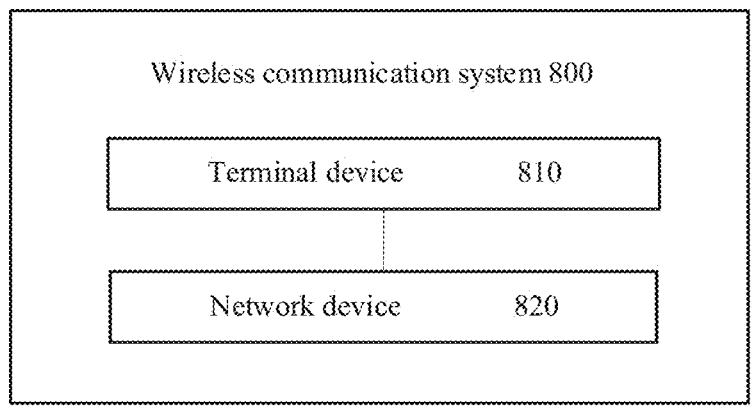
FIG. 19 is a schematic architectural diagram of a wireless communication system according to an embodiment of the present invention.

FIG. 19 is a schematic architectural diagram of a wireless communication system 800 according to an embodiment of the present invention. The system 800 uses at least two air interfaces, configuration information of the at least two air interfaces is different, the at least two air interfaces include a common air interface and at least one dedicated air interface, and as shown in FIG. 19, the system 800 includes:

a terminal device 810, in which configuration information of the common air interface is prestored, configured to receive configuration information of a target dedicated air interface and indication information of a target transmission resource from the network device through the common air interface, where the target transmission resource is a transmission resource used by the target dedicated air interface, and configured to perform wireless communication with the network device by using the target dedicated air interface and the target transmission resource; and a network device 820, in which configuration information of the common air interface is prestored, configured to send configuration information of a target dedicated air interface and indication information of a target transmission resource to the terminal device through the common air interface, where the target transmission resource is a transmission resource used by the target dedicated air interface, and configured to perform wireless communication with the terminal device by using the target dedicated air interface and the target transmission resource.

Optionally, the configuration information includes at least one of a waveform parameter, a modulation scheme, a multiple access method, a bandwidth configuration, a radio frame configuration method, a resource multiplexing mode, a user scheduling mode, a channel configuration method, a coding scheme, or a protocol stack configuration method.

Optionally, the target dedicated air interface is determined by the network device or the terminal device in the at least one dedicated air interface according to related information of the terminal device, and the related information of the terminal device includes at least one of a service type of a service accessed by the terminal device, mobility of the terminal device, or a transmission rate requirement of the terminal device.

Optionally, the network device and the terminal device are further configured to transmit, through the common air interface, broadcast information corresponding to the target dedicated air interface; or the network device and the terminal device are further configured to transmit, through the target dedicated air interface, broadcast information corresponding to the target dedicated air interface; or the network device and the terminal device are further configured to transmit public broadcast information through the common air interface, where the public broadcast information is same information in broadcast information corresponding to each dedicated air interface, and the network device and the terminal device are further configured to transmit, through the target dedicated air interface, information other than the public broadcast information in broadcast information corresponding to the target dedicated air interface.

Optionally, the network device and the terminal device are further configured to transmit, through the common air interface, a synchronization signal corresponding to the target dedicated air interface, where the synchronization signal corresponding to the target dedicated air interface and a synchronization signal corresponding to the common air interface are a same signal; or the network device and the terminal device are further configured to transmit, through the common air interface, a measurement signal corresponding to the target dedicated air interface, where the measurement signal corresponding to the target dedicated air interface and a measurement signal corresponding to the common air interface are a same signal; or the network device and the terminal device are further configured to transmit, a paging signal corresponding to the target dedicated air interface, where the paging signal corresponding to the target dedicated air interface and a paging signal corresponding to the common air interface are carried on a same channel.

Optionally, the network device and the terminal device are further configured to transmit, according to the target dedicated air interface, a synchronization signal corresponding to the target dedicated air interface; or the network device and the terminal device are further configured to transmit, through the target dedicated air interface, a measurement signal corresponding to the target dedicated air interface; or the network device and the terminal device are further configured to transmit, through the target dedicated air interface, a paging signal corresponding to the target dedicated air interface.

Optionally, the network device and the terminal device are further configured to perform, by using a same channel, access processing corresponding to the target dedicated air interface and access processing corresponding to the common air interface; or the network device and the terminal device are further configured to perform, by using different channels, access processing corresponding to the target dedicated air interface and access processing corresponding to the common air interface.

Optionally, the network device includes a macro station and a micro station, the macro station performs wireless communication by using the common air interface, and the micro station performs wireless communication by using the dedicated air interface.

The terminal device 810 according to this embodiment of the present invention may correspond to the terminal device in the method in the embodiments of the present invention, and the foregoing and other operations and/or functions of units, that is, modules in the terminal device 810 are respectively for implementing corresponding procedures in the method 200 in FIG. 3. For brevity, details are not described herein again.

The network device 820 according to this embodiment of the present invention may correspond to the network device in the method in the embodiments of the present invention, and the foregoing and other operations and/or functions of units, that is, modules in the network device 820 are respectively for implementing corresponding procedures in the method 300 in FIG. 14. For brevity, details are not described herein again.

According to the wireless communication system in this embodiment of the present invention, the terminal device and the network device determine through negotiation, through a specified common air interface, in at least one dedicated air interface, a target dedicated air interface and a transmission resource used by the target dedicated air interface, and perform wireless communication by using the target professional air interface, so that multiple air interfaces can share one communication system, and a communication system does not need to be separately configured for a dedicated air interface, thereby reducing costs and meeting a personalized requirement for an air interface in time.

Figure 20:
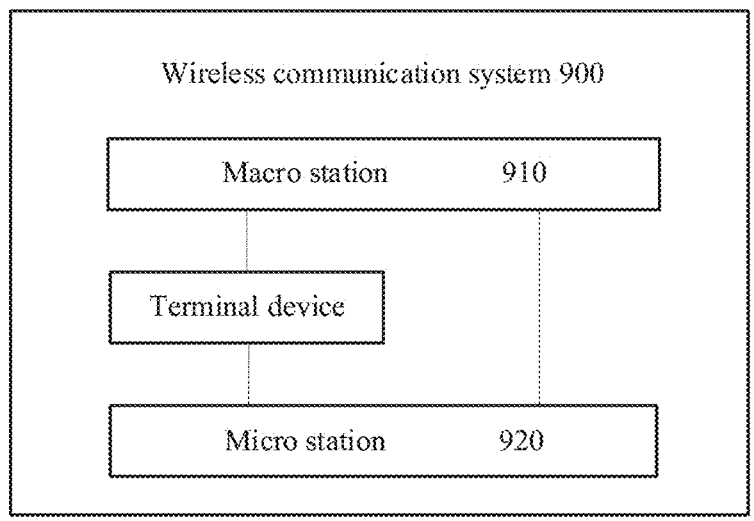
FIG. 20 is a schematic architectural diagram of a wireless communication system according to another embodiment of the present invention.

FIG. 20 is a schematic architectural diagram of a wireless communication system 900 according to an embodiment of the present invention. The system 900 uses at least two air interfaces, configuration information of the at least two air interfaces is different, the at least two air interfaces include a common air interface and at least one dedicated air interface, and as shown in FIG. 20, the system 900 includes:

a macro station 910, configured to send configuration information of a target dedicated air interface and indication information of a target transmission resource to the terminal device through the common air interface, where the target transmission resource is a transmission resource used by the target dedicated air interface; and a micro station 920, configured to perform wireless communication with the terminal device by using the target dedicated air interface and the target transmission resource.

Optionally, the configuration information includes at least one of a waveform parameter, a modulation scheme, a multiple access method, a bandwidth configuration, a radio frame configuration method, a resource multiplexing mode, a user scheduling mode, a channel configuration method, a coding scheme, or a protocol stack configuration method.

Optionally, the macro station is further configured to obtain related information of the terminal device, where the related information of the terminal device includes at least one of a service type of a service accessed by the terminal device, mobility of the terminal device, or a transmission rate requirement of the terminal device; and the macro station is further configured to determine the target dedicated air interface in the at least one dedicated air interface according to the related information of the terminal device.

Optionally, the macro station is further configured to send configuration information of the at least one dedicated air interface to the terminal device through the common air interface, so that the terminal device determines the target dedicated air interface in the at least one dedicated air interface according to related information of the terminal device, where the related information of the terminal device includes at least one of a service type of a service accessed by the terminal device, mobility of the terminal device, or a transmission rate requirement of the terminal device.

Optionally, the macro station is further configured to send broadcast information corresponding to the target dedicated air interface to the network device through the common air interface; or the micro station is further configured to send broadcast information corresponding to the target dedicated air interface to the network device through the target dedicated air interface; or the macro station is further configured to: send public broadcast information to the terminal device through the common air interface, where the public broadcast information is same information in broadcast information corresponding to each dedicated air interface, and the micro station is further configured to send information other than the public broadcast information in broadcast information corresponding to the target dedicated air interface to the terminal device through the target dedicated air interface.

Optionally, the macro station is further configured to send a synchronization signal corresponding to the target dedicated air interface to the terminal device through the common air interface, where the synchronization signal corresponding to the target dedicated air interface and a synchronization signal corresponding to the common air interface are a same signal; or the macro station is further configured to send a measurement signal corresponding to the target dedicated air interface to the terminal device through the common air interface, where the measurement signal corresponding to the target dedicated air interface and a measurement signal corresponding to the common air interface are a same signal; or the macro station is further configured to send a paging signal corresponding to the target dedicated air interface to the terminal device through the common air interface, where the paging signal corresponding to the target dedicated air interface and a paging signal corresponding to the common air interface are carried on a same channel.

Optionally, the micro station is further configured to send a synchronization signal corresponding to the target dedicated air interface to the terminal device through the target dedicated air interface; or the micro station is further configured to send a measurement signal corresponding to the target dedicated air interface to the terminal device through the target dedicated air interface; or the micro station is further configured to send a paging signal corresponding to the target dedicated air interface to the terminal device through the target dedicated air interface.

Optionally, the macro station and the micro station are further configured to perform, by using a same channel, access processing corresponding to the target dedicated air interface and access processing corresponding to the common air interface; or the macro station and the micro station are further configured to perform, by using different channels, access processing corresponding to the target dedicated air interface and access processing corresponding to the common air interface.

The macro station 910 and the micro station 920 according to this embodiment of the present invention may correspond to the network device in the method in the embodiments of the present invention, and the foregoing and other operations and/or functions of units, that is, modules in the macro station 910 and the micro station 920 are respectively for implementing corresponding procedures in the method 300 in FIG. 14. For brevity, details are not described herein again.

According to the wireless communication system in this embodiment of the present invention, the terminal device and the network device determine through negotiation, through a specified common air interface, in at least one dedicated air interface, a target dedicated air interface and a transmission resource used by the target dedicated air interface, and perform wireless communication by using the target professional air interface, so that multiple air interfaces can share one communication system, and a communication system does not need to be separately configured for a dedicated air interface, thereby reducing costs and meeting a personalized requirement for an air interface in time.

Figure 21:
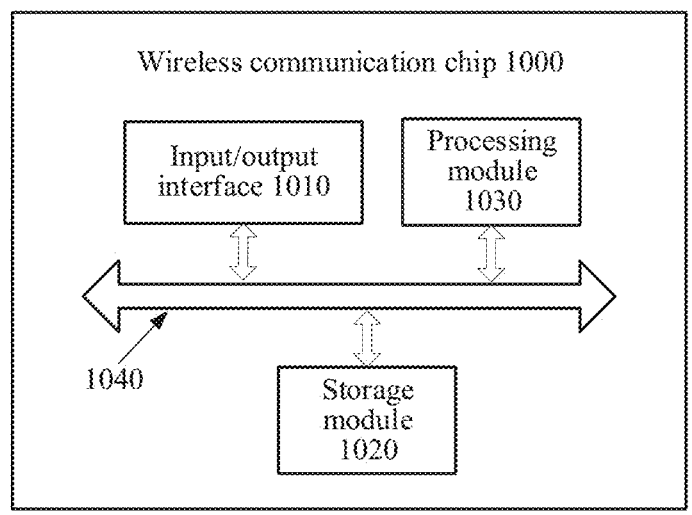
FIG. 21 is a schematic structural diagram of a wireless communication chip according to an embodiment of the present invention.

FIG. 21 is a schematic structural diagram of a wireless communication chip 1000 according to an embodiment of the present invention. A terminal device in which the chip 1000 is configured can perform wireless communication by using at least two air interfaces, configuration information of the at least two air interfaces is different, the at least two air interfaces include a common air interface and at least one dedicated air interface, and as shown in FIG. 21, the chip 1000 includes: an input/output interface 1010, a storage module 1020, at least one processing module 1030, and a bus module 1040. The input/output interface 1010, the storage module 1020, the processing module 1030, and the storage module 1020 may be connected by using the bus module 1040. Configuration information of the common air interface is preconfigured in the storage module 1020, and the storage module 1020 may be configured to store an instruction. The processing module 1030 is configured to execute the instruction stored in the processing module 1030, to control the terminal device to receive configuration information of a target dedicated air interface and indication information of a target transmission resource from a network device through the common air interface, where the target transmission resource is a transmission resource used by the target dedicated air interface; and control the terminal device to perform wireless communication with the network device through the target dedicated air interface and the target transmission resource.

Optionally, the configuration information includes at least one of a waveform parameter, a modulation scheme, a multiple access method, a bandwidth configuration, a radio frame configuration method, a resource multiplexing mode, a user scheduling mode, a channel configuration method, a coding scheme, or a protocol stack configuration method.

Optionally, the target dedicated air interface is determined by the network device in the at least one dedicated air interface according to related information of the terminal device, and the related information of the terminal device includes at least one of a service type of a service accessed by the terminal device, mobility of the terminal device, or a transmission rate requirement of the terminal device.

Optionally, the chip 1000 is specifically configured to control the terminal device to receive, according to the common air interface, configuration information of the at least one dedicated air interface that is sent by the network device; and configured to determine the target dedicated air interface in the at least one dedicated air interface according to related information of the terminal device, where the related information of the terminal device includes at least one of a service type of a service accessed by the terminal device, mobility of the terminal device, or a transmission rate requirement of the terminal device.

Optionally, the chip 1000 of the terminal device is specifically configured to control the terminal device to receive, through the common air interface, broadcast information corresponding to the target dedicated air interface and sent by the network device; or the chip 1000 is specifically configured to control the terminal device to receive, through the target dedicated air interface, broadcast information corresponding to the target dedicated air interface and sent by the network device; or the chip 1000 is specifically configured to control the terminal device to receive, through the common air interface, public broadcast information sent by the network device, where the public broadcast information is same information in broadcast information corresponding to each dedicated air interface, and receive, through the target dedicated air interface, information other than the public broadcast information in broadcast information corresponding to the target dedicated air interface and sent by the network device.

Optionally, the chip 1000 is specifically configured to control the terminal device to receive, through the common air interface, a synchronization signal corresponding to the target dedicated air interface and sent by the network device, where the synchronization signal corresponding to the target dedicated air interface and a synchronization signal corresponding to the common air interface are a same signal; or optionally, the chip 1000 is specifically configured to control the terminal device to receive, through the common air interface, a measurement signal corresponding to the target dedicated air interface and sent by the network device, where the measurement signal corresponding to the target dedicated air interface and a measurement signal corresponding to the common air interface are a same signal; or optionally, the chip 1000 is specifically configured to control the terminal device to receive, through the common air interface, a paging signal corresponding to the target dedicated air interface and sent by the network device, where the paging signal corresponding to the target dedicated air interface and a paging signal corresponding to the common air interface are carried on a same channel.

Optionally, the chip 1000 is specifically configured to control the terminal device to receive, according to the target dedicated air interface, a synchronization signal corresponding to the target dedicated air interface and sent by the network device; or optionally, the chip 1000 is specifically configured to control the terminal device to receive, according to the target dedicated air interface, a measurement signal corresponding to the target dedicated air interface and sent by the network device; or optionally, the chip 1000 is specifically configured to control the terminal device to receive, according to the target dedicated air interface, a paging signal corresponding to the target dedicated air interface and sent by the network device.

Optionally, the chip 1000 is specifically configured to control the terminal device to perform, by using a same channel, access processing corresponding to the target dedicated air interface and access processing corresponding to the common air interface; or optionally, the chip 1000 is specifically configured to control the terminal device to perform, by using different channels, access processing corresponding to the target dedicated air interface and access processing corresponding to the common air interface.

Optionally, the network device includes a macro station and a micro station, the macro station performs wireless communication by using the common air interface, and the micro station performs wireless communication by using the dedicated air interface.

Optionally, the chip 1000 is specifically configured to control the terminal device, the communication system includes multiple micro stations, each micro station performs wireless communication by using the common air interface, and the network device is a micro station whose coverage covers a location of the terminal device.

The terminal device controlled by the chip 1000 according to this embodiment of the present invention may correspond to the terminal device in the method in the embodiments of the present invention, and the foregoing and other operations and/or functions of units, that is, modules in the chip 1000 are respectively for implementing corresponding procedures in the method 200 in FIG. 3. For brevity, details are not described herein again.

According to the wireless communication chip in this embodiment of the present invention, the terminal device and the network device determine through negotiation, through a specified common air interface, in at least one dedicated air interface, a target dedicated air interface and a transmission resource used by the target dedicated air interface, and perform wireless communication by using the target professional air interface, so that multiple air interfaces can share one communication system, and a communication system does not need to be separately configured for a dedicated air interface, thereby reducing costs and meeting a personalized requirement for an air interface in time.

Figure 22:
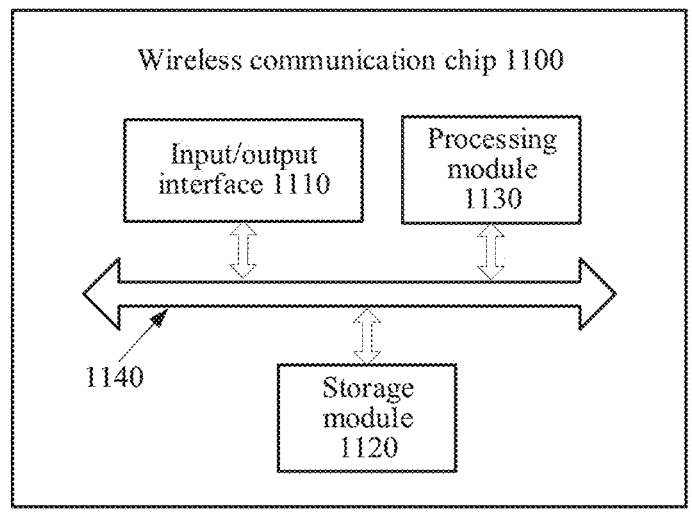
FIG. 22 is a schematic structural diagram of a wireless communication chip according to another embodiment of the present invention.

FIG. 22 is a schematic structural diagram of a wireless communication chip 1100 according to another embodiment of the present invention. A terminal device in which the chip 1100 is configured can perform wireless communication by using at least two air interfaces, configuration information of the at least two air interfaces is different, the at least two air interfaces include a common air interface and at least one dedicated air interface, and as shown in FIG. 22, the chip 1100 includes: an input/output interface 1110, a storage module 1120, at least one processing module 1130, and a bus module 1140. The input/output interface 1110, the storage module 1120, the processing module 1130, and the storage module 1120 may be connected by using the bus module 1140. Configuration information of the common air interface is preconfigured in the storage module 1120, and the storage module 1120 may be configured to store an instruction. The processing module 1130 is configured to execute the instruction stored in the processing module 1130, to control the network device to send configuration information of a target dedicated air interface and indication information of a target transmission resource to the terminal device through the common air interface, where the target transmission resource is a transmission resource used by the target dedicated air interface; and control the network device to perform wireless communication with the terminal device by using the target dedicated air interface and the target transmission resource.

Optionally, the configuration information includes at least one of a waveform parameter, a modulation scheme, a multiple access method, a bandwidth configuration, a radio frame configuration method, a resource multiplexing mode, a user scheduling mode, a channel configuration method, a coding scheme, or a protocol stack configuration method.

Optionally, the chip 1100 is specifically configured to control the network device to obtain related information of the terminal device, where the related information of the terminal device includes at least one of a service type of a service accessed by the terminal device, mobility of the terminal device, or a transmission rate requirement of the terminal device; and determine the target dedicated air interface in the at least one dedicated air interface according to the related information of the terminal device.

Optionally, the chip 1100 is specifically configured to control the network device to send configuration information of the at least one dedicated air interface to the terminal device through the common air interface, so that the terminal device determines the target dedicated air interface in the at least one dedicated air interface according to related information of the terminal device, where the related information of the terminal device includes at least one of a service type of a service accessed by the terminal device, mobility of the terminal device, or a transmission rate requirement of the terminal device.

Optionally, the chip 1100 is specifically configured to control the network device to send broadcast information corresponding to the target dedicated air interface to the network device through the common air interface; or optionally, the chip 1100 is specifically configured to control the network device to send broadcast information corresponding to the target dedicated air interface to the network device through the target dedicated air interface; or optionally, the chip 1100 is specifically configured to control the network device to: send public broadcast information to the terminal device through the common air interface, where the public broadcast information is same information in broadcast information corresponding to each dedicated air interface, and send information other than the public broadcast information in broadcast information corresponding to the target dedicated air interface to the terminal device through the target dedicated air interface.

Optionally, the chip 1100 is specifically configured to control the network device to send a synchronization signal corresponding to the target dedicated air interface to the terminal device through the common air interface, where the synchronization signal corresponding to the target dedicated air interface and a synchronization signal corresponding to the common air interface are a same signal; or optionally, the chip 1100 is specifically configured to control the network device to send a measurement signal corresponding to the target dedicated air interface to the terminal device through the common air interface, where the measurement signal corresponding to the target dedicated air interface and a measurement signal corresponding to the common air interface are a same signal; or optionally, the chip 1100 is specifically configured to control the network device to send a paging signal corresponding to the target dedicated air interface to the terminal device through the common air interface, where the paging signal corresponding to the target dedicated air interface and a paging signal corresponding to the common air interface are carried on a same channel.

Optionally, the chip 1100 is specifically configured to control the network device to send a synchronization signal corresponding to the target dedicated air interface to the terminal device through the target dedicated air interface; or optionally, the chip 1100 is specifically configured to control the network device to send a measurement signal corresponding to the target dedicated air interface to the terminal device through the target dedicated air interface; or optionally, the chip 1100 is specifically configured to control the network device to send a paging signal corresponding to the target dedicated air interface to the terminal device through the target dedicated air interface.

Optionally, the chip 1100 is specifically configured to control the network device to perform, by using a same channel, access processing corresponding to the target dedicated air interface and access processing corresponding to the common air interface; or optionally, the chip 1100 is specifically configured to control the network device to perform, by using different channels, access processing corresponding to the target dedicated air interface and access processing corresponding to the common air interface.

The network device controlled by the chip 1100 according to this embodiment of the present invention may correspond to the network device in the method in the embodiments of the present invention, and the foregoing and other operations and/or functions of units, that is, modules in the chip 1100 are respectively for implementing corresponding procedures in the method 300 in FIG. 14. For brevity, details are not described herein again.

According to the wireless communication chip in this embodiment of the present invention, the terminal device and the network device determine through negotiation, through a specified common air interface, in at least one dedicated air interface, a target dedicated air interface and a transmission resource used by the target dedicated air interface, and perform wireless communication by using the target professional air interface, so that multiple air interfaces can share one communication system, and a communication system does not need to be separately configured for a dedicated air interface, thereby reducing costs and meeting a personalized requirement for an air interface in time.

A computer-readable storage medium stores a control instruction. The control instruction is executed by a processor configured in a terminal device, the terminal device is configured in a communication system using at least two air interfaces, configuration information of the at least two air interfaces is different, the at least two air interfaces include a common air interface and at least one dedicated air interface, configuration information of the common air interface is preconfigured in a network device and the terminal device, and the control instruction is configured to enable the terminal device to perform the following actions:

receiving, by the terminal device, configuration information of a target dedicated air interface and indication information of a target transmission resource from the network device through the common air interface according to the preconfigured configuration information of the common air interface, where the target transmission resource is a transmission resource used by the target dedicated air interface; and performing, by the terminal device, wireless communication with the network device by using the target dedicated air interface and the target transmission resource.

Optionally, the configuration information includes at least one of a waveform parameter, a modulation scheme, a multiple access method, a bandwidth configuration, a radio frame configuration method, a resource multiplexing mode, a user scheduling mode, a channel configuration method, a coding scheme, or a protocol stack configuration method.

Optionally, the target dedicated air interface is determined by the network device in the at least one dedicated air interface according to related information of the terminal device, and the related information of the terminal device includes at least one of a service type of a service accessed by the terminal device, mobility of the terminal device, or a transmission rate requirement of the terminal device.

Optionally, the control instruction is specifically configured to enable the terminal device to receive, according to the common air interface, configuration information of the at least one dedicated air interface that is sent by the network device; and the control instruction is further configured to enable the terminal device to determine the target dedicated air interface in the at least one dedicated air interface according to related information of the terminal device, where the related information of the terminal device includes at least one of a service type of a service accessed by the terminal device, mobility of the terminal device, or a transmission rate requirement of the terminal device.

The control instruction is further configured to enable the terminal device to receive, through the common air interface, broadcast information corresponding to the target dedicated air interface and sent by the network device; or the control instruction is further configured to enable the terminal device to receive, through the target dedicated air interface, broadcast information corresponding to the target dedicated air interface and sent by the network device; or the control instruction is further configured to enable the terminal device to receive, through the common air interface, public broadcast information sent by the network device, where the public broadcast information is same information in broadcast information corresponding to each dedicated air interface, and receive, through the target dedicated air interface, information other than the public broadcast information in broadcast information corresponding to the target dedicated air interface and sent by the network device.

Optionally, the control instruction is further configured to enable the terminal device to receive, through the common air interface, a synchronization signal corresponding to the target dedicated air interface and sent by the network device, where the synchronization signal corresponding to the target dedicated air interface and a synchronization signal corresponding to the common air interface are a same signal; or the control instruction is further configured to enable the terminal device to receive, through the common air interface, a measurement signal corresponding to the target dedicated air interface and sent by the network device, where the measurement signal corresponding to the target dedicated air interface and a measurement signal corresponding to the common air interface are a same signal; or the control instruction is further configured to enable the terminal device to receive, through the common air interface, a paging signal corresponding to the target dedicated air interface and sent by the network device, where the paging signal corresponding to the target dedicated air interface and a paging signal corresponding to the common air interface are carried on a same channel.

Optionally, the control instruction is further configured to enable the terminal device to receive, according to the target dedicated air interface, a synchronization signal corresponding to the target dedicated air interface and sent by the network device; or the control instruction is further configured to enable the terminal device to receive, according to the target dedicated air interface, a measurement signal corresponding to the target dedicated air interface and sent by the network device; or the control instruction is further configured to enable the terminal device to receive, according to the target dedicated air interface, a paging signal corresponding to the target dedicated air interface and sent by the network device.

Optionally, the control instruction is further configured to enable the terminal device to perform, by using a same channel, access processing corresponding to the target dedicated air interface and access processing corresponding to the common air interface; or the control instruction is further configured to enable the terminal device to perform, by using different channels, access processing corresponding to the target dedicated air interface and access processing corresponding to the common air interface.

Optionally, the network device includes a macro station and a micro station, the macro station performs wireless communication by using the common air interface, and the micro station performs wireless communication by using the dedicated air interface.

Optionally, the communication system includes multiple micro stations, each micro station performs wireless communication by using the common air interface, and the network device is a micro station whose coverage covers a location of the terminal device.

The terminal device that executes the control instruction in the computer-readable storage medium according to this embodiment of the present invention may correspond to the terminal device in the method in the embodiments of the present invention, and functions of the control instruction are respectively for implementing corresponding procedures in the method 200 in FIG. 3. For brevity, details are not described herein again.

According to the computer-readable storage medium in this embodiment of the present invention, the terminal device and the network device determine through negotiation, through a specified common air interface, in at least one dedicated air interface, a target dedicated air interface and a transmission resource used by the target dedicated air interface, and perform wireless communication by using the target professional air interface, so that multiple air interfaces can share one communication system, and a communication system does not need to be separately configured for a dedicated air interface, thereby reducing costs and meeting a personalized requirement for an air interface in time.

A computer-readable storage medium stores a control instruction. The control instruction is executed by a processor configured in a network device, the network device is configured in a communication system using at least two air interfaces, configuration information of the at least two air interfaces is different, the at least two air interfaces include a common air interface and at least one dedicated air interface, configuration information of the common air interface is preconfigured in the network device and a terminal device, and the control instruction is configured to enable the network device to perform the following actions:

sending, by the network device, configuration information of a target dedicated air interface and indication information of a target transmission resource to the terminal device through the common air interface, where the target transmission resource is a transmission resource used by the target dedicated air interface; and performing, by the network device, wireless communication with the terminal device by using the target dedicated air interface and the target transmission resource.

Optionally, the configuration information includes at least one of a waveform parameter, a modulation scheme, a multiple access method, a bandwidth configuration, a radio frame configuration method, a resource multiplexing mode, a user scheduling mode, a channel configuration method, a coding scheme, or a protocol stack configuration method.

Optionally, the network device further performs the following actions:

obtaining, by the network device, related information of the terminal device, where the related information of the terminal device includes at least one of a service type of a service accessed by the terminal device, mobility of the terminal device, or a transmission rate requirement of the terminal device; and determining, by the network device, the target dedicated air interface in the at least one dedicated air interface according to the related information of the terminal device.

Optionally, the control instruction is specifically configured to enable the network device to send configuration information of the at least one dedicated air interface to the terminal device through the common air interface, so that the terminal device determines the target dedicated air interface in the at least one dedicated air interface according to related information of the terminal device, where the related information of the terminal device includes at least one of a service type of a service accessed by the terminal device, mobility of the terminal device, or a transmission rate requirement of the terminal device.

Optionally, the control instruction is further configured to enable the network device to send broadcast information corresponding to the target dedicated air interface to the network device through the common air interface; or optionally, the control instruction is further configured to enable the network device to send broadcast information corresponding to the target dedicated air interface to the network device through the target dedicated air interface; or optionally, the control instruction is further configured to enable the network device to: send public broadcast information to the terminal device through the common air interface, where the public broadcast information is same information in broadcast information corresponding to each dedicated air interface, and send information other than the public broadcast information in broadcast information corresponding to the target dedicated air interface to the terminal device through the target dedicated air interface.

Optionally, the control instruction is further configured to enable the network device to send a synchronization signal corresponding to the target dedicated air interface to the terminal device through the common air interface, where the synchronization signal corresponding to the target dedicated air interface and a synchronization signal corresponding to the common air interface are a same signal; or optionally, the control instruction is further configured to enable the network device to send a measurement signal corresponding to the target dedicated air interface to the terminal device through the common air interface, where the measurement signal corresponding to the target dedicated air interface and a measurement signal corresponding to the common air interface are a same signal; or optionally, the control instruction is further configured to enable the network device to send a paging signal corresponding to the target dedicated air interface to the terminal device through the common air interface, where the paging signal corresponding to the target dedicated air interface and a paging signal corresponding to the common air interface are carried on a same channel.

Optionally, the control instruction is further configured to enable the network device to send a synchronization signal corresponding to the target dedicated air interface to the terminal device through the target dedicated air interface; or optionally, the control instruction is further configured to enable the network device to send a measurement signal corresponding to the target dedicated air interface to the terminal device through the target dedicated air interface; or optionally, the control instruction is further configured to enable the network device to send a paging signal corresponding to the target dedicated air interface to the terminal device through the target dedicated air interface.

Optionally, the control instruction is further configured to enable the network device to perform, by using a same channel, access processing corresponding to the target dedicated air interface and access processing corresponding to the common air interface; or optionally, the control instruction is further configured to enable the network device to perform, by using different channels, access processing corresponding to the target dedicated air interface and access processing corresponding to the common air interface.

The network device that executes the control instruction in the computer-readable storage medium according to this embodiment of the present invention may correspond to the network device in the method in the embodiments of the present invention, and functions of the control instruction are respectively for implementing corresponding procedures in the method 300 in FIG. 14. For brevity, details are not described herein again.

According to the computer-readable storage medium in this embodiment of the present invention, the terminal device and the network device determine through negotiation, through a specified common air interface, in at least one dedicated air interface, a target dedicated air interface and a transmission resource used by the target dedicated air interface, and perform wireless communication by using the target professional air interface, so that multiple air interfaces can share one communication system, and a communication system does not need to be separately configured for a dedicated air interface, thereby reducing costs and meeting a personalized requirement for an air interface in time.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A wireless communication method, performed in a communication system, comprising:
    providing at least two air interfaces, wherein configuration information of the at least two air interfaces is different, the at least two air interfaces comprise a first air interface and at least one second air interface, and configuration information of the first air interface is preconfigured in a network device and a terminal device,
    receiving, by the terminal device, configuration information of a target second air interface and indication information of a target transmission resource from the network device through the first air interface, wherein the target transmission resource is a transmission resource used by the target second air interface; and
    performing, by the terminal device, wireless communication with the network device by using the target second air interface and the target transmission resource,
    wherein the target second air interface is determined based on related information of the terminal device, and the related information of the terminal device includes a target service type of a service accessed by the terminal device.

2. The method according to claim 1, wherein the configuration information comprises at least one of a waveform parameter, a modulation scheme, a multiple access method, a bandwidth configuration, a radio frame configuration method, a resource multiplexing mode, a user scheduling mode, a channel configuration method, a coding scheme, or a protocol stack configuration method.

3. The method according to claim 1, wherein the target second air interface is determined by the network device in the at least one second air interface according to the related information of the terminal device, and the related information of the terminal device further comprises mobility of the terminal device, or a transmission rate requirement of the terminal device.

4. The method according to claim 1, wherein the receiving, by the terminal device according to the first air interface, configuration information of a target second air interface and indication information of a target transmission resource that are sent by the network device comprises:
    receiving, by the terminal device according to the first air interface, configuration information of the at least one second air interface that is sent by the network device; and
    the method further comprises:
    determining, by the terminal device, the target second air interface in the at least one second air interface according to the related information of the terminal device, wherein the related information of the terminal device further comprises mobility of the terminal device, or a transmission rate requirement of the terminal device.

5. The method according to claim 1, wherein the method further comprises:
    receiving, by the terminal device through the first air interface, broadcast information corresponding to the target second air interface and sent by the network device; or receiving, by the terminal device through the target second air interface, broadcast information corresponding to the target second air interface and sent by the network device; or receiving, by the terminal device through the first air interface, public broadcast information sent by the network device, wherein the public broadcast information is same information in broadcast information corresponding to each second air interface, and receiving, through the target second air interface, information other than the public broadcast information in broadcast information corresponding to the target second air interface and sent by the network device.

6. The method according to claim 1, wherein the method further comprises:
receiving, by the terminal device through the first air interface, a synchronization signal corresponding to the target second air interface and sent by the network device, wherein the synchronization signal corresponding to the target second air interface and a synchronization signal corresponding to the first air interface are a same signal; or
receiving, by the terminal device through the first air interface, a measurement signal corresponding to the target second air interface and sent by the network device, wherein the measurement signal corresponding to the target second air interface and a measurement signal corresponding to the first air interface are a same signal; or
receiving, by the terminal device through the first air interface, a paging signal corresponding to the target second air interface and sent by the network device, wherein the paging signal corresponding to the target second air interface and a paging signal corresponding to the first air interface are carried on a same channel.

7. The method according to claim 1, wherein the method further comprises:
receiving, by the terminal device according to the target second air interface, a synchronization signal corresponding to the target second air interface and sent by the network device; or
receiving, by the terminal device according to the target second air interface, a measurement signal corresponding to the target second air interface and sent by the network device; or
receiving, by the terminal device according to the target second air interface, a paging signal corresponding to the target second air interface and sent by the network device.

8. The method according to claim 1, wherein the method further comprises:
performing, by the terminal device by using a same channel, access processing corresponding to the target second air interface and access processing corresponding to the first air interface; or
performing, by the terminal device by using different channels, access processing corresponding to the target second air interface and access processing corresponding to the first air interface.

9. The method according to claim 1, wherein the network device comprises a macro station and a micro station, the macro station performs wireless communication by using the first air interface, and the micro station performs wireless communication by using the second air interface.

10. The method according to claim 1, wherein the communication system comprises multiple micro stations, each micro station performs wireless communication by using the first air interface, and the network device is a micro station whose coverage covers a location of the terminal device.

11. A wireless communication apparatus configured in a communication system, comprising:
at least two air interfaces, wherein configuration information of the at least two air interfaces is different, the at least two air interfaces comprise a first air interface and at least one second air interface, and configuration information of the first air interface is preconfigured in a network device and the apparatus,
a communication interface circuit configured to receive configuration information of a target second air interface and indication information of a target transmission resource from the network device through the first air interface, wherein the target transmission resource is a transmission resource used by the target second air interface; and
a processor configured to perform wireless communication with the network device by using the target second air interface and the target transmission resource,
wherein the target second air interface is determined based on related information of the terminal device, and the related information of the terminal device includes a target service type of a service accessed by the terminal device.

12. The apparatus according to claim 11, wherein the configuration information comprises at least one of a waveform parameter, a modulation scheme, a multiple access method, a bandwidth configuration, a radio frame configuration method, a resource multiplexing mode, a user scheduling mode, a channel configuration method, a coding scheme, or a protocol stack configuration method.

13. The apparatus according to claim 11, wherein the target second air interface is determined by the network device in the at least one second air interface according to the related information of the apparatus, and the related information of the apparatus further comprises mobility of the apparatus, or a transmission rate requirement of the apparatus.

14. The apparatus according to claim 11, wherein the communication interface circuit is specifically configured to receive, according to the first air interface, configuration information of the at least one second air interface that is sent by the network device; and
the processor configured to determine the target second air interface in the at least one second air interface according to the related information of the apparatus, wherein the related information of the apparatus further comprises mobility of the apparatus, or a transmission rate requirement of the apparatus.

15. The apparatus according to claim 11, wherein the communication interface circuit is further configured to receive, through the first air interface, broadcast information corresponding to the target second air interface and sent by the network device; or
the communication interface circuit is further configured to receive, through the target second air interface, broadcast information corresponding to the target second air interface and sent by the network device; or
the communication interface circuit is further configured to: receive, through the first air interface, public broadcast information sent by the network device, wherein the public broadcast information is same information in broadcast information corresponding to each second air interface, and receive, through the target second air interface, information other than the public broadcast information in broadcast information corresponding to the target second air interface and sent by the network device.

16. The apparatus according to claim 11, wherein the communication interface circuit is further configured to receive, through the first air interface, a synchronization signal corresponding to the target second air interface and sent by the network device, wherein the synchronization signal corresponding to the target second air interface and a synchronization signal corresponding to the first air interface are a same signal; or
the communication interface circuit is further configured to receive, through the first air interface, a measurement signal corresponding to the target second air interface and sent by the network device, wherein the measurement signal corresponding to the target second air interface and a measurement signal corresponding to the first air interface are a same signal; or
the communication interface circuit is further configured to receive, through the first air interface, a paging signal corresponding to the target second air interface and sent by the network device, wherein the paging signal corresponding to the target second air interface and a paging signal corresponding to the first air interface are carried on a same channel.

17. The apparatus according to claim 11, wherein the communication interface circuit is further configured to receive, according to the target second air interface, a synchronization signal corresponding to the target second air interface and sent by the network device; or
the communication interface circuit is further configured to receive, according to the target second air interface, a measurement signal corresponding to the target second air interface and sent by the network device; or
the communication interface circuit is further configured to receive, according to the target second air interface, a paging signal corresponding to the target second air interface and sent by the network device.

18. The apparatus according to claim 11, wherein the processor is further configured to perform, by using a same channel, access processing corresponding to the target second air interface and access processing corresponding to the first air interface; or
the processor is further configured to perform, by using different channels, access processing corresponding to the target second air interface and access processing corresponding to the first air interface.

19. The apparatus according to claim 11, wherein the network device comprises a macro station and a micro station, the macro station performs wireless communication by using the first air interface, and the micro station performs wireless communication by using the second air interface.

20. The apparatus according to claim 11, wherein the communication system comprises multiple micro stations, each micro station performs wireless communication by using the first air interface, and the network device is a micro station whose coverage covers a location of the apparatus.

* * * * *